United States Patent
Taguchi et al.

(10) Patent No.: US 10,487,773 B2
(45) Date of Patent: Nov. 26, 2019

(54) VEHICLE MECHANICAL COMPONENT AND PISTON

(71) Applicants: AISIN SEIKI KABUSHIKI KAISHA, Kariya-shi, Aichi-ken (JP); AKROS CO., LTD., Komaki-shi (JP)

(72) Inventors: Yosuke Taguchi, Chiryu (JP); Akikazu Matsumoto, Anjo (JP); Ichiro Hiratsuka, Nagoya (JP); Masaki Kato, Kariya (JP); Daishi Kobayashi, Kariya (JP); Megumi Sugisawa, Toyoake (JP); Takuya Niimi, Handa (JP); Yusuke Ikai, Nukata-gun (JP); Kazuki Saai, Komaki (JP); Shun Mizuno, Komaki (JP)

(73) Assignees: AISIN SEIKI KABUSHIKI KAISHA, Kariya-shi, Aichi-ken (JP); AKROS CO., LTD., Komaki-shi, Aichi-ken (JP)

( * ) Notice: Subject to any disclaimer, the term of this patent is extended or adjusted under 35 U.S.C. 154(b) by 6 days.

(21) Appl. No.: 15/564,052

(22) PCT Filed: Mar. 24, 2016

(86) PCT No.: PCT/JP2016/059470
§ 371 (c)(1),
(2) Date: Oct. 3, 2017

(87) PCT Pub. No.: WO2016/163244
PCT Pub. Date: Oct. 13, 2016

(65) Prior Publication Data
US 2018/0094603 A1 Apr. 5, 2018

(30) Foreign Application Priority Data

Apr. 8, 2015 (JP) ................................ 2015-079532
Jan. 21, 2016 (JP) ................................ 2016-009495

(51) Int. Cl.
*F02F 1/00* (2006.01)
*F02F 3/14* (2006.01)
(Continued)

(52) U.S. Cl.
CPC .............. *F02F 3/14* (2013.01); *C23C 18/122* (2013.01); *C23C 18/127* (2013.01);
(Continued)

(58) Field of Classification Search
CPC .................. F02F 3/00; F05C 2201/021; F05C 2201/0448; F02B 3/06
(Continued)

(56) References Cited

U.S. PATENT DOCUMENTS 3,149,409 A * 9/1964 Maruhn ..................... F02F 3/14
123/193.6
4,254,621 A * 3/1981 Nagumo ............. B22D 19/0009
123/193.5
(Continued)

FOREIGN PATENT DOCUMENTS

JP 2014/028326 A 2/2014
JP 2014/138951 A 7/2014
(Continued)

OTHER PUBLICATIONS

International Search Report (ISA/210), with English translation, dated Jun. 14, 2016 by the International Searching Authority in International Application No. PCT/JP2016/059470; 3 pages.
(Continued)

*Primary Examiner* — John Kwon
(74) *Attorney, Agent, or Firm* — Buchanan Ingersoll & Rooney PC

(57) ABSTRACT

This vehicle mechanical component includes a mechanical component body, a heat insulating layer formed on the mechanical component body, and a protective layer formed
(Continued)

on the heat insulating layer and including an inorganic compound that includes an alkoxide and scale-like inorganic solid particles dispersed in the inorganic compound.

20 Claims, 11 Drawing Sheets

(51) Int. Cl.
| | |
|---|---|
| C23C 20/08 | (2006.01) |
| F02F 3/12 | (2006.01) |
| C23C 28/04 | (2006.01) |
| C25D 11/24 | (2006.01) |
| F02F 1/24 | (2006.01) |
| C25D 11/08 | (2006.01) |
| C25D 11/10 | (2006.01) |
| C23C 18/12 | (2006.01) |
| C23C 28/00 | (2006.01) |
| F01D 25/14 | (2006.01) |
| F02K 1/82 | (2006.01) |
| B32B 9/04 | (2006.01) |
| B32B 15/01 | (2006.01) |
| F16J 1/01 | (2006.01) |
| C25D 11/02 | (2006.01) |

(52) U.S. Cl.
CPC ...... *C23C 18/1212* (2013.01); *C23C 18/1216* (2013.01); *C23C 20/08* (2013.01); *C23C 28/04* (2013.01); *C23C 28/321* (2013.01); *C23C 28/324* (2013.01); *C23C 28/34* (2013.01); *C25D 11/08* (2013.01); *C25D 11/10* (2013.01); *C25D 11/246* (2013.01); *F01D 25/145* (2013.01); *F02F 1/243* (2013.01); *F02F 3/12* (2013.01); *F02K 1/822* (2013.01); *B32B 9/041* (2013.01); *B32B 15/017* (2013.01); *C25D 11/022* (2013.01); *F05D 2220/40* (2013.01); *F05D 2230/90* (2013.01); *F05D 2300/20* (2013.01); *F05D 2300/44* (2013.01); *F05D 2300/502* (2013.01); *F05D 2300/603* (2013.01); *F16J 1/01* (2013.01)

(58) Field of Classification Search
USPC ...................................... 123/193.6
See application file for complete search history.

(56) References Cited

U.S. PATENT DOCUMENTS

| | | | |
|---|---|---|---|
| 2009/0002820 A1* | 1/2009 | Okano | G02B 1/105 359/483.01 |
| 2009/0075206 A1* | 3/2009 | Kanchiku | B41C 1/1008 430/286.1 |
| 2010/0243141 A1* | 9/2010 | Muro | B41M 5/426 156/234 |
| 2013/0146041 A1 | 6/2013 | Hijii et al. | |
| 2013/0327289 A1 | 12/2013 | Hiratsuka et al. | |
| 2015/0204233 A1* | 7/2015 | Nanba | F02F 1/18 123/668 |
| 2015/0204269 A1 | 7/2015 | Hiratsuka et al. | |
| 2016/0177818 A1 | 6/2016 | Nishikawa et al. | |
| 2018/0117942 A1* | 5/2018 | Shimanaka | G03F 7/00 |

FOREIGN PATENT DOCUMENTS

| | | |
|---|---|---|
| JP | 2014/173496 A | 9/2014 |
| WO | 2014/024494 A1 | 2/2014 |

OTHER PUBLICATIONS

Written Opinion dated Jun. 14, 2107 by the International Search Authority, (ISA/237) in International Application No. PCT/JP2016/059470; 3 pages.

* cited by examiner

FIG.3
PHOTOGRAPHS OF SURFACES IN EXAMPLE 1, EXAMPLE 2, AND COMPARATIVE EXAMPLE 4
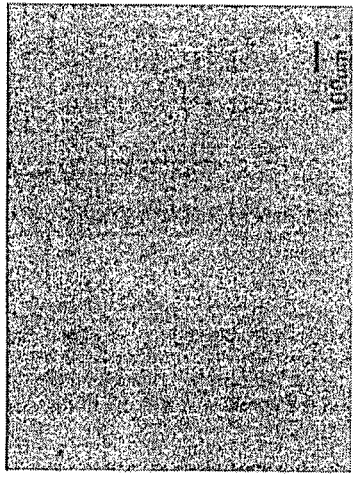
EXAMPLE 1
(TALC IN OUTERMOST LAYER)
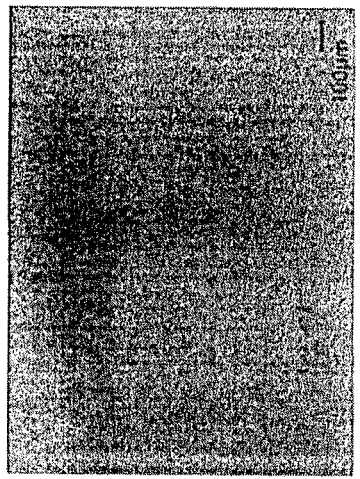
EXAMPLE 2
(MICA IN OUTERMOST LAYER)
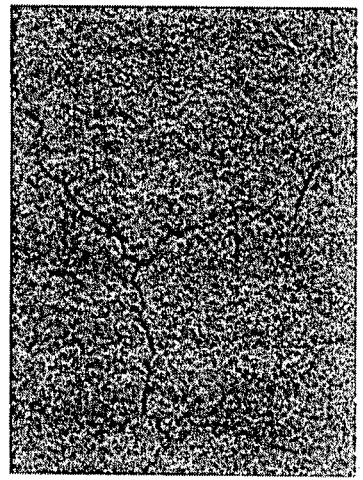
COMPARATIVE EXAMPLE 4
(HOLLOW PARTICLE IN OUTERMOST LAYER)

FIG. 4    SECTIONAL PHOTOGRAPH OF PROTECTIVE LAYER IN EXAMPLE 1
FIG. 5
SECTIONAL PHOTOGRAPH OF PROTECTIVE LAYER IN EXAMPLE 2
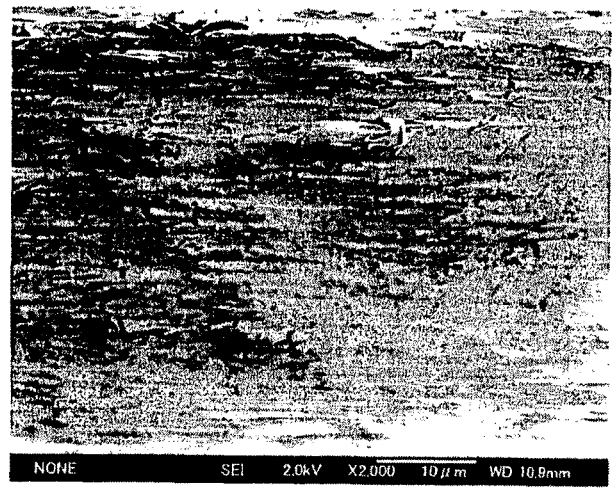

RESULTS OF CROSS-CUT TEST IN SECOND EXAMPLE

TEST MATERIAL 1
(WITH LASER PROCESSING AND
MODIFICATION PROCESSING)

TEST MATERIAL 2
(WITHOUT LASER PROCESSING OR
MODIFICATION PROCESSING)

RESULTS OF CROSS-CUT ADHESION TEST IN SECOND EXAMPLE

TEST MATERIAL 3
(WITH ADDITION OF
COUPLING AGENT)

TEST MATERIAL 4
(WITHOUT ADDITION
OF COUPLING AGENT)

MEASUREMENT RESULTS OF TEST MATERIAL 8

VEHICLE MECHANICAL COMPONENT AND PISTON

TECHNICAL FIELD

The present invention relates to a vehicle mechanical component and a piston.

BACKGROUND ART

In general, a piston on which a heat insulating layer is formed is known. Such a piston on which a heat insulating layer is formed is disclosed in International Publication No. WO2014/024494, for example.

International Publication No. WO2014/024494 discloses a piston having a top surface on which a heat insulating coating film is formed. This heat insulating coating film formed on the piston includes a heat insulating layer that coats the top of the piston and an inorganic coating layer that coats the heat insulating layer. The heat insulating layer is made of a resin and hollow particles embedded in the resin. Furthermore, the inorganic coating layer is made of an inorganic compound and hollow particles embedded in the inorganic compound. Incidentally, the hollow particles are generally spherical.

PRIOR ART

Patent Document

Patent Document 1: International Publication No. WO2014/024494

SUMMARY OF THE INVENTION

Problems to be Solved by the Invention

The inventors of this application have found that in the heat insulating coating film formed on the piston described in International Publication No. WO2014/024494, the heat resistance of the inorganic coating layer including the follow particles is not sufficient particularly in a high-temperature environment exceeding about 700° C., and thus cracks occur in the inorganic coating layer such that the inorganic coating layer tends to be peeled off. Therefore, in the piston described in International Publication No. WO2014/024494, there is such a problem that the inorganic coating layer is peeled off in the high-temperature environment such that the heat insulating layer having a low heat resistance is exposed and deteriorated, and hence it is difficult to ensure high heat insulating properties. In this case, heat is likely to escape from the deteriorated heat insulating layer in the piston such that the thermal efficiency of an internal combustion engine in which the piston is used is reduced, and thus the fuel economy of the internal combustion engine is reduced.

The present invention has been proposed in order to solve the aforementioned problems, and an object of the present invention is to provide a vehicle mechanical component and a piston each capable of ensuring high heat insulating properties even in a high-temperature environment.

Means for Solving the Problems

The inventors of this application have made deep studies to find the following structure for attaining the aforementioned object. That is, a vehicle mechanical component according to a first aspect of the present invention includes a mechanical component body, a heat insulating layer formed on the mechanical component body, and a protective layer formed on the heat insulating layer and including an inorganic compound that includes an alkoxide and scale-like inorganic solid particles dispersed in the inorganic compound.

In the vehicle mechanical component according to the first aspect of the present invention, as hereinabove described, the protective layer including the inorganic compound that includes an alkoxide and the scale-like inorganic solid particles dispersed in the inorganic compound is formed on the heat insulating layer. Thus, the scale-like inorganic solid particles can be easily dispersed so as to form layers in the inorganic compound as compared with the case where spherical hollow particles are dispersed in the inorganic compound, and hence even when the vehicle mechanical component is disposed in a high-temperature environment, occurrence of cracks due to the scale-like inorganic solid particles stacked in layers can be suppressed. As a result, it is possible to suppress peeling of the protective layer, and hence the heat insulating layer can be maintained even in a high-temperature environment. Consequently, high heat insulating properties can be ensured in the vehicle mechanical component. Particularly, the vehicle mechanical component such as a piston is exposed to a high-temperature environment, and hence it is very effective that high heat insulating properties can be ensured even in a high-temperature environment.

In the vehicle mechanical component according to the first aspect, the scale-like inorganic solid particles are preferably made of mica, talc, or wollastonite. According to this structure, the scale-like inorganic solid particles can be more easily dispersed so as to form layers in the inorganic compound by using mica, talc, or wollastonite.

In the vehicle mechanical component according to the first aspect, a binder including a coupling agent and having an amino group is preferably dispersed in the inorganic compound of the protective layer, and the amino group of the binder and a constituent component of the heat insulating layer preferably bind to each other. According to this structure, the adhesion strength (peeling strength) between the protective layer and the heat insulating layer can be improved, and hence the protective layer and the heat insulating layer can more strongly adhere to each other.

In the vehicle mechanical component according to the first aspect, the protective layer preferably further includes a void elongated in a transverse direction perpendicular to a thickness direction of the protective layer. According to this structure, the heat insulating properties at the protective layer can be improved due to the void having a small thermal conductivity, and hence high heat insulating properties can be ensured in the vehicle mechanical component due to not only the heat insulating layer but also the protective layer. Furthermore, the void is elongated in the transverse direction such that the void having a small thermal conductivity can be located over a wider range of the protective layer in the transverse direction as compared with a void elongated in the thickness direction, and hence the thermal conductivity of the protective layer can be reduced over a wide range.

In this case, the void is preferably formed between layers of the scale-like inorganic solid particles stacked in the protective layer. According to this structure, the transversely elongated void can be easily formed in the protective layer without being inhibited by the scale-like inorganic solid particles.

In the vehicle mechanical component according to the first aspect, the heat insulating layer preferably includes a first heat insulating layer formed on the mechanical component body and a second heat insulating layer formed on a surface of the first heat insulating layer and including an inorganic compound, and a functional group that binds to a constituent component of the second heat insulating layer is preferably provided on the surface of the first heat insulating layer on a side of the second heat insulating layer by modification processing using an organic metallic compound. According to this structure, the adhesion strength between the first heat insulating layer and the second heat insulating layer including the inorganic compound can be improved due to the functional group, and hence the first heat insulating layer and the second heat insulating layer can more strongly adhere to each other. Furthermore, the first heat insulating layer and the second heat insulating layer are provided as the heat insulating layer such that a material having a high adhesion to the mechanical component body or a material having high heat insulating properties can be used as the first heat insulating layer on a side of the mechanical component body, and a material having a high heat resistance and a high strength can be used as a binder of the second heat insulating layer on the outer surface side, for example. Thus, the properties of the vehicle mechanical component such as the heat resistance and the heat insulating properties can be effectively improved.

In the vehicle mechanical component according to the first aspect, the heat insulating layer preferably includes a first heat insulating layer formed on the mechanical component body and a second heat insulating layer formed on a surface of the first heat insulating layer, and a recess that the second heat insulating layer enters is preferably provided on the surface of the first heat insulating layer on a side of the second heat insulating layer. According to this structure, the second heat insulating layer enters the recess such that the adhesion strength between the first heat insulating layer and the second heat insulating layer can be improved. Thus, the first heat insulating layer and the second heat insulating layer can more strongly adhere to each other.

In the vehicle mechanical component according to the first aspect, the heat insulating layer preferably includes an anodized coating layer formed on a surface of the mechanical component body, the anodized coating layer preferably includes a micrometer-sized micropore extending from a surface thereof on a side of the protective layer and a nanometer-sized nanopore extending from the surface thereof on the side of the protective layer, and an amount of the inorganic compound impregnated into the micropore and the nanopore is preferably adjusted such that a void content of the micropore is larger than a void content of the nanopore. According to this structure, the inorganic compound is impregnated into the micropore and the nanopore such that the inorganic compound impregnated into the micropore and the nanopore and the inorganic compound of the protective layer can be integrated with each other, and hence the anodized coating layer and the protective layer can strongly adhere to each other. Furthermore, the void content of the micropore is larger than the void content of the nanopore such that the void content of the micropore can be increased to reduce the thermal conductivity of the anodized coating layer while the void content of the nanopore is relatively reduced to maintain the hardness of the anodized coating layer.

In the vehicle mechanical component according to the first aspect, the scale-like inorganic solid particles are preferably dispersed in the inorganic compound to be at least 35 vol % and not more than 80 vol %. According to this structure, the scale-like inorganic solid particles can be reliably dispersed so as to form layers in the inorganic compound.

In the vehicle mechanical component according to the first aspect, the heat insulating layer preferably includes a first heat insulating layer, formed on the mechanical component body, in which first heat insulating layer hollow particles are dispersed and a second heat insulating layer formed on a surface of the first heat insulating layer. According to this structure, the heat insulating properties of the first heat insulating layer can be further improved due to the first heat insulating layer hollow particles.

In this case, the vehicle mechanical component preferably further includes a primer layer, disposed on a surface of the mechanical component body between the mechanical component body and the first heat insulating layer, in which neither hollow particles nor solid particles are dispersed. According to this structure, due to the primer layer, the direct contact of hollow particles and solid particles with the piston body can be suppressed, and hence the adhesion area between the first heat insulating layer and the piston body through the primer layer can be reliably increased.

In the vehicle mechanical component further including the primer layer, both a thickness of the first heat insulating layer and a thickness of the second heat insulating layer are preferably larger than a thickness of the protective layer, and are preferably larger than a thickness of the primer layer. According to this structure, the thickness of the first heat insulating layer and the thickness of the second heat insulating layer can be increased, and hence the heat insulating properties of the piston can be reliably improved.

In the vehicle mechanical component including the first heat insulating layer and the second heat insulating layer, the second heat insulating layer preferably includes a heat insulating layer inorganic compound including an alkoxide or an alkaline silicate and second heat insulating layer hollow particles dispersed in the heat insulating layer inorganic compound. According to this structure, the heat resistance, chemical resistance, and strength can be improved due to the heat insulating layer inorganic compound made of an inorganic compound while the heat insulating properties are improved due to the second heat insulating layer hollow particles.

In the vehicle mechanical component according to the first aspect, a thickness of the protective layer is preferably at least 10 µm and not more than 500 µm. According to this structure, the thickness of the protective layer is at least 10 µm such that the heat resistance at the protective layer can be reliably maintained. Furthermore, the thickness of the protective layer is not more than 500 µm such that concentration of stresses in the protective layer can be suppressed.

A piston according to a second aspect of the present invention includes a piston body, a heat insulating layer formed on the piston body, and a protective layer formed on the heat insulating layer and including an inorganic compound that includes an alkoxide and scale-like inorganic solid particles dispersed in the inorganic compound.

In the piston according to the second aspect of the present invention, the protective layer including the inorganic compound that includes an alkoxide and the scale-like inorganic solid particles dispersed in the inorganic compound is formed on the heat insulating layer. Thus, similarly to the vehicle mechanical component according to the first aspect, the heat insulating layer can be maintained even in a high-temperature environment due to the protective layer. Consequently, high heat insulating properties can be ensured in the piston, and hence it is possible to reduce the likelihood of escape of heat from the piston. Thus, a reduction in the thermal efficiency of an internal combustion engine using the piston can be suppressed, and hence the fuel economy of the internal combustion engine can be improved.

BRIEF DESCRIPTION OF THE DRAWINGS

FIG. 3 Photographs of surfaces in Example 1, Example 2, and Comparative Example 4 of a first example conducted in order to confirm the effect of the present invention.

FIG. 4 A sectional photograph of a protective layer in Example 1 of the first example conducted in order to confirm the effect of the present invention.

FIG. 5 A sectional photograph of a protective layer in Example 2 of the first example conducted in order to confirm the effect of the present invention.

MODES FOR CARRYING OUT THE INVENTION

Embodiments of the present invention are hereinafter described on the basis of the drawings.

First Embodiment

The structure of an internal combustion engine 100 (engine) of a vehicle according to a first embodiment of the present invention is described with reference to FIGS. 1 and 2.

(Structure of Internal Combustion Engine)

Figure 1:
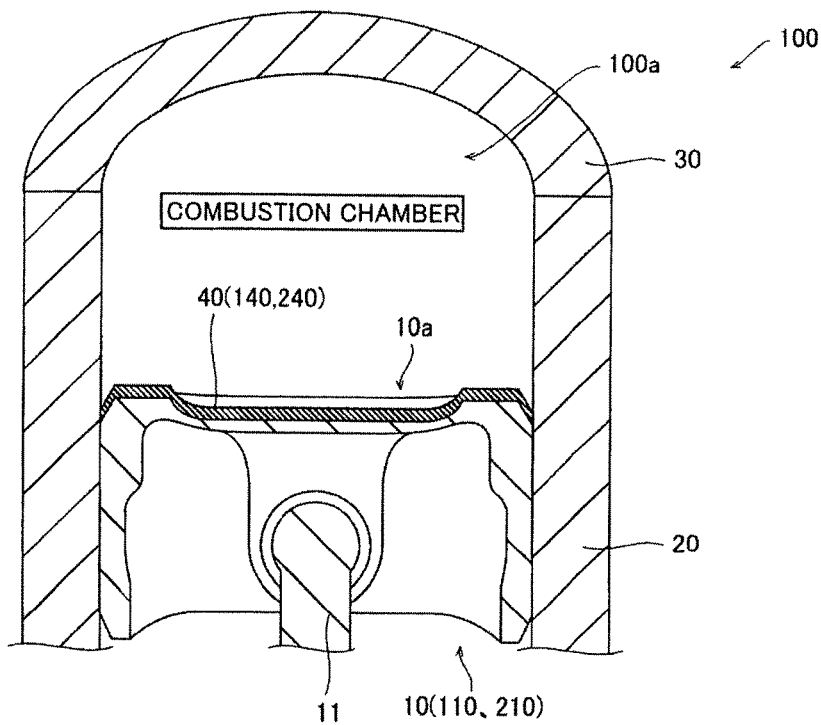
FIG. 1 A schematic view showing the vicinity of a combustion chamber of an internal combustion engine according to first to third embodiments of the present invention.

The internal combustion engine 100 according to the first embodiment of the present invention includes a combustion chamber 100a in which fuel is burned, as shown in FIG. 1. This combustion chamber 100a is formed in a space surrounded by a piston 10 that defines its lower portion, a cylinder block 20 that partially defines its side, and a cylinder head 30 that defines its upper portion. Furthermore, the piston 10 has a piston body 11 made of an aluminum alloy and a coating layer 40 disposed on a top 10a of the piston 10 on the side of the combustion chamber 100a and having high heat insulating properties (low thermal conductivity). This coating layer 40 suppresses escape of heat in the combustion chamber 100a through the piston body 11 from the combustion chamber 100a. The piston 10 and the piston body 11 are examples of a "vehicle mechanical component" and a "mechanical component body" in the present invention, respectively.

<Structure of Coating Layer>

Figure 2:
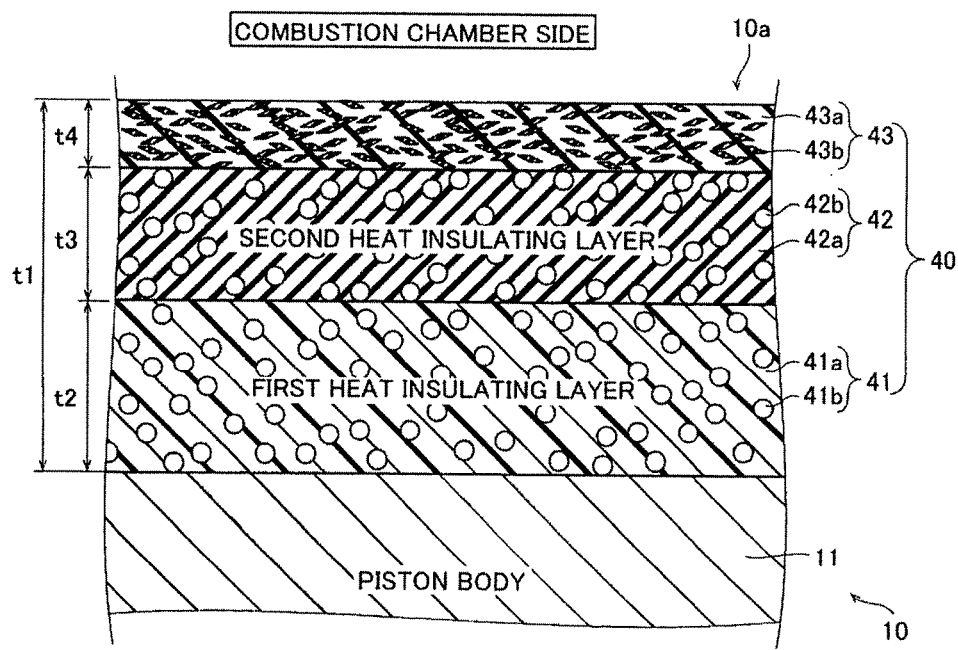
FIG. 2 An enlarged sectional view showing the vicinity of a coating layer according to the first embodiment of the present invention.

According to the first embodiment, the coating layer 40 has a three-layer structure including a first heat insulating layer 41 formed on a surface of the piston body 11 at the top 10a, a second heat insulating layer 42 formed on a surface of the first heat insulating layer 41, and a protective layer 43 formed on a surface of the second heat insulating layer 42, as shown in FIG. 2. The protective layer 43 constitutes outermost layers of the coating layer 40 and the piston 10, and is exposed on the side of the combustion chamber 100a. The thickness t1 of the coating layer 40 is at least about 31 μm and not more than about 3100 μm. The first heat insulating layer 41 and the second heat insulating layer 42 are examples of a "heat insulating layer" in the present invention.

The first heat insulating layer 41 is provided to increase the heat insulating properties of the piston 10. This first heat insulating layer 41 includes a layer body 41a that mainly forms the first heat insulating layer 41 and a number of hollow particles 41b dispersed in the layer body 41a. The hollow particles 41b are examples of "first heat insulating layer hollow particles" in the present invention.

The layer body 41a of the first heat insulating layer 41 is preferably made of an adhesive, heat-resistant, chemical-resistant, and sufficiently strong material. As the layer body 41a, an organic material such as epoxy resins, amino resins, polyaminoamide resins, phenol resins, xylene resins, furan resins, silicone resins, polyether imide, polyether sulfone, polyether ketone, polyether ether ketone, polyamideimide, polybenzimidazole, thermoplastic polyimide, or non-thermoplastic polyimide can be used. Incidentally, an organic material is used as the layer body 41a such that as compared with the case where an inorganic material is used, the thermal conductivity is smaller than that of the inorganic material, and hence the heat insulating properties of the first heat insulating layer 41 can be further improved, and an adhesion strength between the first heat insulating layer 41 and the piston body 11 can be improved.

The hollow particles 41b of the first heat insulating layer 41 are particles having hollow inner portions covered with outer shells, and the thermal conductivity at the hollow portions is small. Thus, in the first heat insulating layer 41 in which a number of the hollow particles 41b have been dispersed in the layer body 41a, the hollow portions of the hollow particles 41b result in voids such that the thermal conductivity is reduced, and the heat insulating properties are improved. Furthermore, the hollow particles 41b are dispersed such that the percentage of voids (porosity) in the first heat insulating layer 41 is at least about 5 vol % and not more than about 90 vol %. Incidentally, the porosity is at least about 5 vol % such that the heat insulating properties can be sufficiently improved. The porosity is not more than about 90 vol % such that the layer body 41a can be sufficiently ensured, and hence failing to form the first heat insulating layer 41 in a layer can be suppressed. The porosity in the first heat insulating layer 41 is preferably at least about 10 vol % and not more than about 85 vol %. A material for the outer shells of the hollow particles 41b is preferably a ceramic material or an organic material, and more preferably silica (silicon dioxide).

The thickness t2 of the first heat insulating layer 41 may be any thickness so far as the heat insulating properties can be sufficiently ensured. Specifically, the thickness t2 of the first heat insulating layer 41 is at least about 20 μm and not more than about 2000 μm, and preferably at least about 20 μm and not more than about 1000 μm. The average particle diameter of the hollow particles 41b is preferably smaller than the thickness t2 of the first heat insulating layer 41. The average particle diameter of the hollow particles 41b is at least about 1 μm and not more than about 100 μm, and preferably at least about 1 μm and not more than about 50 μm.

The second heat insulating layer 42 is provided to ensure the heat resistance and strength of the coating layer 40 while increasing the heat insulating properties of the piston 10. This second heat insulating layer 42 includes a layer body 42a that mainly forms the second heat insulating layer 42 and a number of hollow particles 42b dispersed in the layer body 42a. In the second heat insulating layer 42, similarly to the first heat insulating layer 41, a number of the hollow particles 42b are dispersed such that the heat insulating properties are improved. Incidentally, the hollow particles 42b of the second heat insulating layer 42 have a shape and properties substantially the same as those of the hollow particles 41b of the aforementioned first heat insulating layer 41, and the porosity in the second heat insulating layer 42 is substantially the same as the porosity in the first heat insulating layer 41. The hollow particles 42b are examples of "second heat insulating layer hollow particles" in the present invention.

The layer body 42a of the second heat insulating layer 42 is made of an inorganic compound including a metal oxide that contains an alkaline silicate or an alkoxide. When an alkaline silicate (sodium silicate ($Na_2SiO_3$), for example) is used to form the layer body 42a of the second heat insulating layer 42, a heat treatment or an acid neutralization treatment is performed on an alkaline silicate such that an inorganic compound mainly including a siloxane bond (—Si—O—Si—) in which silicate ions have been polymerized with each other is formed as the layer body 42a. Thus, a strong inorganic coating is formed as the second heat insulating layer 42.

When a silicon alkoxide ($Si(OR)_4$: R is a functional group such as an ethyl group) is used to form the layer body 42a of the second heat insulating layer 42, for example, a dehydration reaction or a dealcoholization reaction occurs due to the heat treatment, and the inorganic compound mainly including a siloxane bond is formed as the layer body 42a. Thus, as the second heat insulating layer 42, a strong inorganic coating having a high heat resistance, a high chemical resistance, and a high strength is formed.

As the alkoxide, a silicon alkoxide, a zirconium alkoxide ($Zr(OR)_4$), an aluminum alkoxide ($Al(OR)_4$), and a cerium alkoxide ($Ce(OR)_4$) can be used alone or in combination. In this case, an inorganic compound mainly including a covalent bond (—X—O—Y—: X (Y) is any of Si, Zr, Al, and Ce) that contains oxygen is formed as the layer body 42a, and as the second heat insulating layer 42, a strong inorganic coating having a high heat resistance, a high chemical resistance, and a high strength is formed.

The thickness t3 of the second heat insulating layer 42 may be any thickness so far as the heat insulating properties can be sufficiently ensured. Specifically, the thickness t3 of the second heat insulating layer 42 is at least about 10 μm and not more than about 1000 μm, and preferably at least about 10 μm and not more than about 500 μm. The average particle diameter of the hollow particles 42b is preferably smaller than the thickness t3 of the second heat insulating layer 42.

The protective layer 43 is provided to protect the first heat insulating layer 41 and the second heat insulating layer 42 on the inner side (the side of the piston body 11) from high temperature. This protective layer 43 is provided such that no cracks or the like occur even in a high-temperature environment exceeding about 700° C. (a temperature environment of about 900° C., for example). The protective layer 43 includes a layer body 43a that mainly forms the protective layer 43 and a number of inorganic solid particles 43b dispersed in the layer body 43a.

The layer body 43a of the protective layer 43 is made of an inorganic compound including a metal oxide that contains the aforementioned alkoxide such as a silicon alkoxide, a zirconium alkoxide, an aluminum alkoxide, or a cerium alkoxide. Thus, as the protective layer 43, a strong inorganic coating having a high heat resistance, a high chemical resistance, and a high strength is formed. When the layer body of the protective layer is made of an inorganic compound including a metal oxide that contains an alkaline silicate, an alkaline component such as sodium carbonate, for example, as a by-product at the time of treating the alkaline silicate remains, as extraneous material, in the protective layer, and thus the heat resistance properties of the protective layer is reduced. When as in the first embodiment, the layer body 43a of the protective layer 43 is made of an inorganic compound including a metal oxide that contains an alkoxide, on the other hand, water or alcohol as a by-product at the time of treating the alkoxide is produced, but can be removed from the protective layer 43 by the heat treatment. Thus, extraneous material can be prevented from remaining in the protective layer 43, and hence the heat resistance properties of the protective layer 43 can be improved.

According to the first embodiment, the inorganic solid particles 43b of the protective layer 43 include scale-like inorganic particles having non-hollow inner portions filled with inorganic materials. Note that the term "scale-like" denotes a scale-like flake that is small in its thickness direction and extends on a plane perpendicular to the thickness direction. Specifically, the inorganic solid particles 43b are made of scale-like talc, mica, and wollastonite. Incidentally, the inorganic solid particles 43b may be made of any one of talc, mica, and wollastonite, or may be made of any two or all three of these. The average particle diameter (average particle diameter on the plane perpendicular to the thickness direction) of the inorganic solid particles 43b is at least about 1 μm and not more than about 100 μm, and preferably at least about 1 μm and not more than about 50 μm.

Note that talc denotes hydrous magnesium silicates ($Mg_3Si_4O_{10}(OH)_2$), and the specific gravity thereof is about 2.7. Furthermore, mica denotes silicate minerals ($KMg_3(Si_3Al)O_{10}(OH)_2$), and the specific gravity thereof is about 2.9. Still furthermore, wollastonite denotes silicate minerals ($CaSiO_3$), and the specific gravity thereof is about 2.9. None of talc, mica, and wollastonite is melted even when being placed under a temperature condition of about 1000° C., and the same have a sufficient heat resistance.

The scale-like inorganic solid particles 43b are dispersed so as to form layers in the layer body 43a. Incidentally, the inorganic solid particles 43b are dispersed in the layer body 43a so as to be at least about 35 vol % and not more than about 80 vol %, and thus a sufficient amount of inorganic solid particles 43b are dispersed in the layer body 43a such that the inorganic solid particles 43b are stacked in the layer body 43a.

The inorganic solid particles 43b dispersed in the layer body 43a are scale-like such that an effect of forming irregularities (surface roughness) on a surface (outer surface) of the protective layer 43 is small as compared with the case where spherical hollow particles are dispersed. As a result, the surface of the protective layer 43 is formed smoothly.

In the coating layer 40, both the thickness t2 of the first heat insulating layer 41 and the thickness t3 of the second heat insulating layer 42 are greater than the thickness t4 of the protective layer 43. Specifically, the thickness t2 of the first heat insulating layer 41 is at least about 20 μm and not more than about 2000 μm, and preferably at least about 20 μm and not more than about 1000 μm. Thus, the first heat insulating layer 41 and the second heat insulating layer 42 that contribute to improvement in the heat insulating properties of the piston 10 can be sufficiently ensured.

The thickness t4 of the protective layer 43 is at least about 10 μm and not more than about 500 μm, and preferably at least about 10 μm and not more than about 300 μm.
(Process for Manufacturing Piston)

A process for manufacturing the piston 10 on which the coating layer 40 is formed according to the first embodiment of the present invention is now described with reference to FIGS. 1 and 2.

First, the piston body 11 made of an aluminum alloy and formed into a predetermined shape by casting or the like is prepared. Then, as shown in FIG. 2, the first heat insulating layer 41 is formed on the surface of the piston body 11 at the top 10a. Specifically, first, the hollow particles 41b having a predetermined average particle diameter are added to an organic coating that contains a predetermined organic material, and the mixture is stirred with a stirrer (not shown). At this time, the hollow particles 41b are added such that the porosity in the first heat insulating layer 41 after formation is at least about 5 vol % and not more than about 90 vol %. Then, the organic coating, to which the hollow particles 41b have been added, is applied onto the surface of the piston body 11 at the top 10a, and is baked. Thus, on the surface of the piston body 11, the first heat insulating layer 41 in which the hollow particles 41b have been dispersed is formed so as to have a predetermined thickness t2.

Then, the second heat insulating layer 42 is formed on the surface of the first heat insulating layer 41. Specifically, first, the hollow particles 42b having a predetermined average particle diameter are added to a water-based coating that contains a predetermined alkaline silicate or alkoxide, and the mixture is stirred with a stirrer. At this time, the hollow particles 42b are added such that the porosity of the hollow particles 42b in the second heat insulating layer 42 after formation is at least about 5 vol % and not more than about 90 vol %. Then, the water-based coating that contains an alkaline silicate or an alkoxide is applied onto the surface of the first heat insulating layer 41, and the heat treatment or the like is performed thereon. At this time, the first heat insulating layer 41 has been formed, and hence it is possible to perform the heat treatment at a temperature higher than about 200° C., which is the annealing temperature of an aluminum alloy. Thus, on the surface of the first heat insulating layer 41, the second heat insulating layer 42 in which the hollow particles 42b have been dispersed is formed so as to have a predetermined thickness t3.

Finally, the protective layer 43 is formed on the surface of the second heat insulating layer 42. Specifically, first, the scale-like inorganic solid particles 43b having a predetermined average particle diameter are added to a water-based coating that contains a predetermined alkoxide, and the mixture is stirred with a stirrer. At this time, the scale-like inorganic solid particles 43b are added such that the volume ratio of the inorganic solid particles 43b in the protective layer 43 after formation is at least about 35 vol % and not more than about 80 vol %. Then, the water-based coating, to which the scale-like inorganic solid particles 43b have been added, is applied onto the surface of the second heat insulating layer 42, and the heat treatment or the like is performed thereon. Thus, on the surface of the second heat insulating layer 42, the protective layer 43 in which the scale-like inorganic solid particles 43b have been dispersed is formed so as to have a predetermined thickness t4. Thus, the piston 10 having the top 10a on which the coating layer 40 is formed as shown in FIG. 1 is manufactured.

Effects of First Embodiment

According to the aforementioned first embodiment, the following effects can be obtained.

According to the first embodiment, as hereinabove described, the protective layer 43 including the layer body 43a made of the inorganic compound including an alkoxide and the scale-like inorganic solid particles 43b dispersed in the layer body 43a is formed on the first heat insulating layer 41 and the second heat insulating layer 42. Thus, the scale-like inorganic solid particles 43b can be easily dispersed so as to form layers in the layer body 43a as compared with the case where spherical hollow particles are dispersed in the inorganic compound (layer body 43a), and hence even when the piston 10 is disposed in a high-temperature environment, occurrence of cracks due to the scale-like inorganic solid particles 43b stacked in layers can be suppressed. As a result, it is possible to suppress peeling of the protective layer 43, and hence the first heat insulating layer 41 and the second heat insulating layer 42 can be maintained even in a high-temperature environment due to the protective layer 43. Consequently, high heat insulating properties can be ensured in the piston 10. Therefore, it is possible to reduce the likelihood of escape of heat from the piston 10, and hence a reduction in the thermal efficiency of the internal combustion engine 100 using the piston 10 can be suppressed. As a result, the fuel economy of the internal combustion engine 100 can be improved.

According to the first embodiment, the scale-like inorganic solid particles 43b are made of mica, talc, or wollastonite such that the scale-like inorganic solid particles 43b can be more easily dispersed so as to form layers in the layer body 43a.

According to the first embodiment, the first heat insulating layer 41 including the layer body 41a made of an organic material and the second heat insulating layer 42 including the layer body 42a made of an inorganic material are provided. Thus, an organic material is used as the layer body 41a of the first heat insulating layer 41 on the side of the piston body 11 such that it is possible to improve the adhesion strength to the piston body 11 and the heat insulating properties, and an inorganic material is used as the layer body 42a of the second heat insulating layer 42 on the outer surface (combustion chamber 100a) side such that it is possible to improve the heat resistance and strength. As a result, the properties of the piston 10 such as the heat resistance and the heat insulating properties can be effectively improved.

According to the first embodiment, the scale-like inorganic solid particles 43b are dispersed in the protective layer 43 so as to be at least about 35 vol % and not more than about 80 vol %. Thus, the scale-like inorganic solid particles 43b can be reliably dispersed so as to form layers in the layer body 43a.

According to the first embodiment, the first heat insulating layer 41 includes the layer body 41a and the hollow particles 41b dispersed in the layer body 41a such that the heat insulating properties of the first heat insulating layer 41 can be further improved due to the hollow particles 41b.

According to the first embodiment, the second heat insulating layer 42 includes the layer body 42a made of the inorganic compound including an alkoxide or an alkaline silicate and the hollow particles 42b dispersed in the layer body 42a. Thus, the heat resistance, chemical resistance, and strength can be improved due to the layer body 42a made of the inorganic compound while the heat insulating properties are improved due to the hollow particles 42b.

According to the first embodiment, the inorganic solid particles 43b are stacked in the layer body 43a such that the protective layer 43 in which the layer body 43a is located between the layers of the stacked inorganic solid particles 43b can be formed, and hence the structure of the protective layer 43 can be strengthened. Thus, the thickness t4 of the protective layer 43 can be easily increased.

According to the first embodiment, the thickness t4 of the protective layer 43 is at least about 10 μm such that the heat resistance at the protective layer 43 can be reliably maintained. Furthermore, the thickness t4 of the protective layer 43 is not more than about 500 μm such that concentration of stresses in the protective layer 43 can be suppressed.

First Example

A performance test of the piston conducted as an example (first example) of the aforementioned first embodiment is now described with reference to FIGS. 1 to 5.

Structure of Examples and Comparative Examples

First, the piston 10 (see FIG. 1) of Example 1 was prepared. As an aluminum alloy constituting the piston body 11, an aluminum alloy equivalent to AC8A-T6 (defined in JIS 5202) was used and formed into a predetermined shape by casting. The composition of the aluminum alloy equivalent to AC8A-T6 is 11 mass % or more and 13 mass % or less of Si, 2.5 mass % or more and 4.0 mass % or less of Cu, 0.5 mass % or more and 1.2 mass % or less of Mg, 1.75 mass % or more and 3.0 mass % or less of Ni, 0.5 mass % or less of Fe, 0.15 mass % or less of Zn, 0.15 mass % or less of Mn, 0.05 mass % or more and 0.20 mass % or less of Ti, 0.05 mass % or more and 0.20 mass % or less of Zr, 0.05 mass % or more and 0.10 mass % or less of V, 0.05 mass % or less of Cr, 0.05 mass % or less of Sn, 0.03 mass % or less of Pb, and the balance Al.

Then, as shown in FIG. 2, the first heat insulating layer 41 was formed on the surface of the piston body 11 at the top 10a. Specifically, the hollow particles 41b, the outer shells of which were made of silica, having an average particle diameter of 19.76 μm were added to an organic coating containing N-methyl-2-pyrrolidone, and the mixture was stirred with a stirrer. At this time, when the weight of the organic coating was set to 100, the hollow particles 41b were added to the organic coating such that the weight of the hollow particles 41b was 130%. Then, the organic coating, to which the hollow particles 41b had been added, was applied onto the surface of the piston body 11 from the side of the top 10a, and was baked. Thus, the first heat insulating layer 41 including the layer body 41a made of a resin containing polyimide and a number of the hollow particles 41b dispersed in the layer body 41a was formed on the surface of the piston body 11. In this case, the first heat insulating layer 41 was formed so as to have a thickness t1 of 100 μm. Furthermore, the porosity in the first heat insulating layer 41 was 78 vol %.

Then, the second heat insulating layer 42 was formed on the surface of the first heat insulating layer 41. Specifically, the hollow particles 42b were added to a water-based coating (so-called water glass) containing a sodium silicate as an alkaline silicate, and the mixture was stirred with a stirrer. At this time, when the weight of the water-based coating was set to 100, the hollow particles 42b were added to the water-based coating such that the weight of the hollow particles 42b was 95%. Then, the water-based coating, to which the hollow particles 42b had been added, was applied onto the surface of the first heat insulating layer 41, and the heat treatment was performed thereon. Thus, the second heat insulating layer 42 including the layer body 42a made of the inorganic compound mainly including silicic acid and a number of the hollow particles 42b dispersed in the layer body 42a was formed on the surface of the first heat insulating layer 41. In this case, the second heat insulating layer 42 was formed so as to have a thickness t3 of 100 μm. Furthermore, the porosity in the second heat insulating layer 42 was 80 vol %.

Then, the protective layer 43 was formed on the surface of the second heat insulating layer 42. Specifically, the inorganic solid particles 43b made of talc and having an average particle diameter of 5.61 μm were added to a water-based coating containing a silicon alkoxide and a zirconium alkoxide as alkoxides, and the mixture was stirred with a stirrer. Then, the water-based coating, to which the inorganic solid particles 43b had been added, was applied onto the surface of the second heat insulating layer 42, and the heat treatment was performed thereon. Thus, the protective layer 43 including the layer body 43a made of the inorganic compound mainly including silicic acid and zirconia and a number of the inorganic solid particles 43b dispersed in the layer body 43a was formed on the surface of the second heat insulating layer 42. In this case, the protective layer 43 was formed so as to have a thickness t4 of 20 µm. Furthermore, the inorganic solid particles 43b were dispersed in the protective layer 43 so as to be 65 vol %. Thus, the piston 10 of Example 1 was prepared.

In Example 2, the piston 10 was prepared in the same manner as in Example 1 except that as inorganic solid particles, the inorganic solid particles 43b made of mica and having an average particle diameter of 5.82 µm were used.

On the other hand, as a piston of Comparative Example 1, an untreated piston on which none of a first heat insulating layer, a second heat insulating layer, and a protective layer was formed was used. Furthermore, as a piston of Comparative Example 2, a piston having a top on which a sprayed film was formed by zirconia thermal spraying instead of a first heat insulating layer, a second heat insulating layer, and a protective layer was used. Incidentally, the sprayed film was formed so as to have a thickness of 0.1 mm.

Furthermore, as a piston of Comparative Example 3, only a first heat insulating layer was formed without providing a second heat insulating layer and a protective layer. Specifically, nano hollow particles, the outer shells of which were made of silica, having an average particle diameter of 0.108 µm were added to an organic coating containing N-methyl-2-pyrrolidone, and the mixture was stirred with a stirrer. At this time, when the weight of the organic coating was set to 100, the nano hollow particles were added to the organic coating such that the weight of the nano hollow particles was 14%. Then, the organic coating, to which the nano hollow particles had been added, was applied onto a surface of a piston body from the side of the top, and was baked. Thus, the first heat insulating layer including a layer body made of a resin containing polyimide and a number of the nano hollow particles dispersed in the layer body was formed on the surface of the piston body. In this case, the first heat insulating layer was formed so as to have a thickness of 125 µm. Furthermore, the porosity in the first heat insulating layer was 15 vol %. Thus, the piston of Comparative Example 3 was prepared.

Furthermore, as a piston of Comparative Example 4, a piston was prepared in the same manner as in Example 1 except that a protective layer was formed with hollow particles instead of inorganic solid particles. Specifically, a piston on which a first heat insulating layer and a second heat insulating layer were formed was prepared in the same manner as in Example 1. Then, nano hollow particles, the outer shells of which were made of silica, having an average particle diameter of 0.108 µm were added to a water-based coating, and the mixture was stirred with a stirrer. At this time, when the weight of the water-based coating was set to 100, the nano hollow particles were added to the organic coating such that the weight of the nano hollow particles was 7%. Then, the water-based coating, to which the nano hollow particles had been added, was applied onto a surface of the second heat insulating layer, and the heat treatment was performed thereon. Thus, the protective layer including a layer body made of an inorganic compound mainly including silicic acid and a number of the hollow particles dispersed in the layer body was formed on the surface of the second heat insulating layer. In this case, the protective layer was formed so as to have a thickness of 20 µm. Furthermore, the porosity of the nano hollow particles was 12 vol %. Thus, the piston of Comparative Example 4 was prepared.

Then, when each of the pistons of Examples 1 and 2 and Comparative Examples 1 to 4 was mounted in an internal combustion engine, whether or not knocking (abnormal combustion) had occurred was determined, and the fuel economy was measured. In this case, as the internal combustion engine, an in-line four cylinder, water-cooled, DOHC, sixteen-valve, four-cycle, and 1300-cc engine was used. Furthermore, as the fuel economy, fuel economy during a period in which the engine water temperature was increased from room temperature, which was the cold state of the engine, to 88° C. was averaged and measured. In this case, the measurement was performed in a state where the rotational speed of the engine was kept constant at 2500 rpm, and a constant load was applied to the engine.

Furthermore, a test material corresponding to each of the pistons of Examples 1 and 2 and Comparative Examples 1 to 4 was used to measure the heat resistance, the thermal conductivity, and the surface roughness (arithmetic average roughness, Ra) were measured. Incidentally, in the measurement of the heat resistance, the temperature at which cracking started to be confirmed when the test material was held for ten minutes was set to a temperature (° C.) as an indicator of the heat resistance. The measurement of the heat resistance was performed with 50° C. increments. Furthermore, when the test material was held at 900° C. for ten minutes, a surface of the test material corresponding to each of the pistons of Examples 1 and 2 and Comparative Example 4 was observed.

Results of First Example

TABLE 1

|  |  | COMPARATIVE EXAMPLE I UNTREATED | COMPARATIVE EXAMPLE 2 ZIRCONIA THERMAL SPRAYING | COMPARATIVE EXAMPLE 3 FIRST HEAT INSULATING LAYER ONLY | COMPARATIVE EXAMPLE 4 HOLLOW PARTICLES IN OUTERMOST LAYER | EXAMPLE 1 TALC IN PROTECTIVE LAYER (OUTERMOST LAYER) | EXAMPLE 2 MICA IN PROTECTIVE LAYER (OUTERMOST LAYER) |
|---|---|---|---|---|---|---|---|
| FIRST HEAT INSULATING LAYER | BINDER | — | — | 100 | 100 | 100 | 100 |
|  | HOLLOW PARTICLE | — | — | 14 | 130 | 130 | 130 |
|  | POROSITY (%) | — | — | 15 | 78 | 78 | 78 |
|  | AVERAGE PARTICLE | — | — | 0.108 | 19.76 | 19.76 | 19.76 |

TABLE 1-continued

|  |  | COMPARATIVE EXAMPLE 1 UNTREATED | COMPARATIVE EXAMPLE 2 ZIRCONIA THERMAL SPRAYING | COMPARATIVE EXAMPLE 3 FIRST HEAT INSULATING LAYER ONLY | COMPARATIVE EXAMPLE 4 HOLLOW PARTICLES IN OUTERMOST LAYER | EXAMPLE 1 TALC IN PROTECTIVE LAYER (OUTERMOST LAYER) | EXAMPLE 2 MICA IN PROTECTIVE LAYER (OUTERMOST LAYER) |
|---|---|---|---|---|---|---|---|
| | DIAMETER (μm) | | | | | | |
| | THICKNESS (μm) | — | — | 125 | 100 | 100 | 100 |
| SECOND HEAT INSULATING LAYER | BINDER | — | — | — | 100 | 100 | 100 |
| | HOLLOW PARTICLE | — | — | — | 95 | 95 | 95 |
| | POROSITY (%) | — | — | — | 80 | 80 | 80 |
| | AVERAGE PARTICLE DIAMETER (μm) | — | — | — | 19.76 | 19.76 | 19.76 |
| | THICKNESS (μm) | — | — | — | 100 | 100 | 100 |
| PROTECTIVE LAYER (OUTERMOST LAYER) | BINDER | — | — | — | 100 | 100 | 100 |
| | HOLLOW PARTICLE | — | — | — | 7 | — | — |
| | POROSITY (%) | — | — | — | 12 | — | — |
| | INORGANIC SOLID PARTICLE | — | — | — | — | 65 | 65 |
| | AVERAGE PARTICLE DIAMETER (μm) | — | — | — | 0.108 | 5.61 | 5.82 |
| | THICKNESS (μm) | — | — | — | 20 | 20 | 20 |
| MEASUREMENT RESULTS | HEAT RESISTANCE (° C.) | 300 | 1250 | 550 | 700 | 1000 | 1000 |
| | THERMAL CONDUCTIVITY (W/M · K) | 130 | 4.0 | 0.16 | 0.11 | 0.11 | 0.11 |
| | SURFACE ROUGHNESS (Ra) | 4.82 | 38 | 1.79 | 1.92 | 0.60 | 0.60 |
| | KNOCKING | ABSENCE | PRESENCE | ABSENCE | ABSENCE | ABSENCE | ABSENCE |
| | FUEL ECONOMY | 100 | UNMEASURABLE DUE TO OCCURRENCE OF KNOCKING | 101 | 101.9 | 103.1 | 103.2 |

As the results of the first example shown in Table 1, the heat resistance was 1000° C. in both Examples 1 and 2, and it has been confirmable that the heat resistance is sufficiently ensured in both Examples 1 and 2. On the other hand, in Comparative Examples 1, 3, and 4, the heat resistance was 700° C. or less, and it has been confirmed that the heat resistance is not sufficiently ensured. This is conceivably because occurrence of cracks was suppressed due to the scale-like inorganic solid particles 43b (talc or mica) dispersed in the protective layer 43. Consequently, it has been confirmable that in the pistons 10 of Examples 1 and 2, high heat insulating properties can be ensured even in a high-temperature environment. Furthermore, also according to the surface states of the test materials of Examples 1 and 2 and Comparative Example 4 shown in FIG. 3, occurrence of cracks cannot be confirmed in Examples 1 and 2 while occurrence of cracks can be confirmed in Comparative Example 4. Also from this, it has been confirmable that in the pistons 10 of Examples 1 and 2, high heat insulating properties can be ensured even in a high-temperature environment.

As shown in Table 1, in both Examples 1 and 2, the thermal conductivity was 0.11 (W/m·K), which was nearly equal to that in Comparative Example 4, the thermal conductivity unchanged relative to that in Comparative Example 3 was obtained, and the thermal conductivity was significantly smaller than those in Comparative examples 1 and 2. Thus, it has been confirmable that the thermal conductivity can be sufficiently reduced in both the pistons 10 of Examples 1 and 2, and the heat insulating properties can be improved.

The surface roughness (Ra) was 0.60 in both Examples 1 and 2, was smaller than those in Comparative Examples 3 and 4, and was significantly smaller than those in Comparative Examples 1 and 2. Thus, it has been confirmable that the surface roughness is sufficiently small in both Examples 1 and 2, and the possibility that knocking occurs is sufficiently reduced in the pistons 10 of Examples 1 and 2. On the other hand, in Comparative Example 2, the surface roughness (Ra) is 38, which is excessively large, and thus it has been confirmable that the possibility that knocking occurs is significantly high in the piston of Comparative Example 2.

In the internal combustion engine in which each of the pistons of Examples 1 and 2 and Comparative Examples 1 to 4 was mounted, knocking did not occur in Examples 1 and 2

2 and Comparative Examples 1, 3, and 4 whereas knocking occurred in the internal combustion engine in which the piston of Comparative Example 2 was mounted. This is because due to the fact that the surface roughness at the top of the piston of Comparative Example 2 was excessively large, heat was concentrated in recesses of a rough surface of the piston during internal combustion engine operation. Thus, knocking conceivably occurred in the internal combustion engine. Consequently, although the coating layer (sprayed film) of Comparative Example 2 is excellent in heat resistance, knocking occurs due to the large surface roughness, and hence the piston of Comparative Example 2 is conceivably inappropriate.

When the fuel economy in Comparative Example 1 (untreated) was set to 100, the fuel economy in Comparative Examples 3 and 4 was less than 102 whereas the fuel economy in Examples 1 and 2 was more than 103, which was larger. Thus, it has been confirmable than in the pistons 10 of Examples 1 and 2, the heat resistance and heat insulating properties are excellent, and hence the fuel economy can be improved in the internal combustion engine 100 in which the pistons 10 of Examples 1 and 2 are mounted.

From sectional photographs of the protective layers 43 of Examples 1 and 2 shown in FIGS. 4 and 5, it has been confirmable that in the layer bodies 43a (inorganic compounds) of the protective layers 43 of Examples 1 and 2, the scale-like inorganic solid particles 43b (talc or mica) are dispersed in a state of being stacked in layers. It can be inferred that this stacking of the scale-like inorganic solid particles 43b suppresses occurrence of cracks such that the heat resistance of the protective layers 43 is improved. Although both the pistons 10 of Examples 1 and 2 sufficiently have a heat resistance and thermal insulating properties, the piston 10 of Example 2 in which the fuel economy has been further improved is conceivably more preferable.

Second Embodiment

The structure of a piston 110 according to a second embodiment of the present invention is now described with reference to FIGS. 1 and 6. In the second embodiment, in addition to the piston 10 according to the first embodiment, the piston 110 in which the adhesion strength between layers and between a first heat insulating layer 141 and a piston body 11 is improved is described as an example. The same structures as those of the aforementioned first embodiment are denoted by the same reference numerals, and description thereof is omitted. The piston 110 is an example of a "vehicle mechanical component" in the present invention.

(Structure of Piston)

As shown in FIG. 1, the piston 110 according to the second embodiment of the present invention includes the piston body 11 made of an aluminum alloy and a coating layer 140 having high heat insulating properties (low thermal conductivity).

<Structure of Coating Layer>

Figure 6:
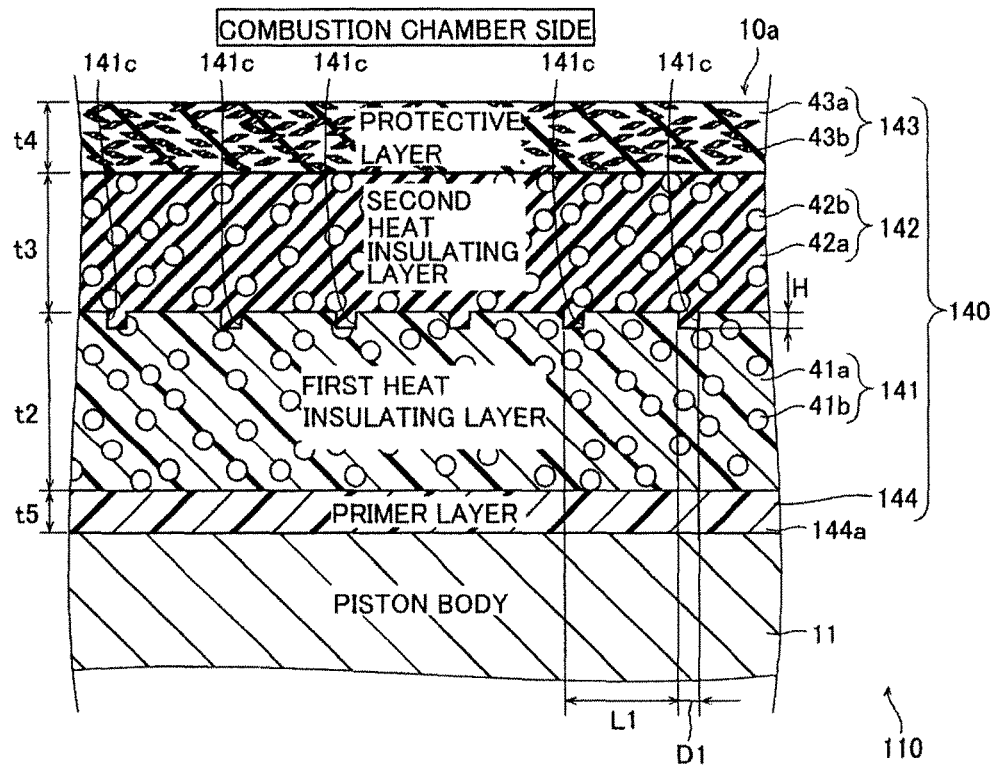
FIG. 6 An enlarged sectional view showing the vicinity of a coating layer according to the second embodiment of the present invention.

According to the second embodiment, the coating layer 140 has a four-layer structure including a primer layer 144 formed on a surface of the piston body 11 at a top 10a, the first heat insulating layer 141 formed on a surface of the primer layer 144, a second heat insulating layer 142 formed on a surface of the first heat insulating layer 141, and a protective layer 143 formed on a surface of the second heat insulating layer 142, as shown in FIG. 6. The first heat insulating layer 141 and the second heat insulating layer 142 are examples of a "heat insulating layer" in the present invention.

The primer layer 144 is provided to improve the adhesion between the piston body 11 and the first heat insulating layer 141. This primer layer 144 includes a layer body 144a, but does not contain hollow particles or solid particles. Thus, a contact area between the piston body 11 and the first heat insulating layer 141 through the primer layer 144 can be increased, and hence the adhesion strength between the first heat insulating layer 141 and the piston body 11 can be improved. In order to sufficiently improve the adhesion strength between the first heat insulating layer 141 and the piston body 11, a ratio of the contact area between the piston body 11 and the first heat insulating layer 141 through the primer layer 144 (a ratio of the contact area to a facing area between the piston body 11 and the first heat insulating layer 141) is preferably about 60% or more.

The thickness t5 of the primer layer 144 is preferably as small as possible so far as the same allows sufficient improvement in the adhesion strength between the first heat insulating layer 141 and the piston body 11. Specifically, the thickness t5 of the primer layer 144 is at least about 10 μm and not more than about 100 μm.

The first heat insulating layer 141 and the second heat insulating layer 142 include layer bodies 41a and 42a and a number of hollow particles 41b and 42b, respectively, similarly to the first heat insulating layer 41 and the second heat insulating layer 42 according to the aforementioned first embodiment. In order to improve the adhesion between the primer layer 144 and the first heat insulating layer 141, the layer body 144a of the primer layer 144 and the layer body 41a of and the first heat insulating layer 141 are preferably made of the same material.

According to the second embodiment, a plurality of fine recesses 141c is formed on the surface of the first heat insulating layer 141 on the side of the second heat insulating layer 142. Portions of the second heat insulating layer 142 enter these recesses 141c such that the shear resistance is increased, and misalignment of the first heat insulating layer 141 and the second heat insulating layer 142 in a parallel direction along the interface therebetween is suppressed. Consequently, the adhesion between the first heat insulating layer 141 and the second heat insulating layer 142 is improved.

Incidentally, the diameter D1 of an opening of each of the recesses 141c on the side of the second heat insulating layer 142 is at least about 10 μm and not more than about 500 μm, and preferably at least about 10 μm and not more than about 100 μm. Furthermore, the diameter D1 is more preferably at least about 30 μm and not more than about 70 μm. A distance L1 between the recesses 141c is preferably about ten times or more the diameter D1. The depth H of each of the recesses 141c is at least about 10 μm and not more than about 100 μm, and preferably at least about 10 μm and not more than about 50 μm. The depth H of each of the recesses 141c is smaller than the thickness t2 of the first heat insulating layer 141.

The internal surface of each of the recesses 141c is preferably inclined such that the inner diameter of the bottom on the side of the primer layer 144 is greater than the diameter D1 of the opening on the side of the second heat insulating layer 142. Thus, the shear resistance can be further increased.

Furthermore, a functional group that binds to a constituent component of the layer body 42a of the second heat insulating layer 142 is formed on the surface of the first heat insulating layer 141 on the side of the second heat insulating layer 142 by modification processing using an organic metallic compound. Specifically, the functional group such as a hydroxy group (—OH) including a silanol group (—Si—OH) or the like, a carbonyl group (—C=O), or a carboxyl group (—COOH) is formed on the surface of the first heat insulating layer 141 including a flat surface of the first heat insulating layer 141 and the inner surfaces of a plurality of formed recesses 141c. This functional group is incorporated into a covalent bond containing oxygen, and forms a covalent bond with an inorganic compound of the second heat insulating layer 142 or forms a hydrogen bond with the oxygen of the covalent bond of the second heat insulating layer 142. Thus, the adhesion between the first heat insulating layer 141 and the second heat insulating layer 142 is improved. Incidentally, the functional group on the surface of the first heat insulating layer 141 is formed by the modification processing in which a combustion flame mixed with an organic metallic compound (special modifier) containing Si is blown onto the surface of the first heat insulating layer 141.

According to the second embodiment, the protective layer 143 includes a layer body 43a and a number of inorganic solid particles 43b, similarly to the protective layer 43 according to the aforementioned first embodiment. In the layer body 43a of the protective layer 143, a binder having an amino group (—NH$_2$) is dispersed in an inorganic compound including a metal oxide that contains an alkoxide. Incidentally, the binder contains an amino-based coupling agent such as aminopropyltriethoxysilane, aminopropyltrimethoxysilane, or aminopropylmethyldimethoxysilane, and enters a portion of a siloxane bond at the time of layer formation. Thus, the binder containing the amino group, which is a polar group and is likely to form a hydrogen bond, is dispersed in the layer body 43a of the protective layer 143. The amino group of this binder forms a hydrogen bond with oxygen in a covalent bond (—X—O—Y—: X (Y) is any of Si, Zr, Al, and Ce), which is a constituent component of the protective layer 143, or forms a hydrogen bond with oxygen in a covalent bond (—X—O—Y—), which is a constituent component of the second heat insulating layer 142. Thus, the strength of the protective layer 143 and the adhesion between the second heat insulating layer 142 and the protective layer 143 are improved.

Both the thickness t2 of the first heat insulating layer 141 and the thickness t3 of the second heat insulating layer 142 are greater than the thickness t4 of the protective layer 143, and are greater than the thickness t5 of the primer layer 144. The thickness t4 of the protective layer 143 is greater than the thickness t5 of the primer layer 144. The remaining structures of the second embodiment are similar to those of the aforementioned first embodiment.

(Process for Manufacturing Piston)

A process for manufacturing the piston 110 on which the coating layer 140 is formed according to the second embodiment of the present invention is now described with reference to FIGS. 1 and 6.

First, the piston body 11 is prepared. Then, as shown in FIG. 6, an organic coating containing a predetermined organic material is applied onto the surface of the piston body 11 at the top 10a (see FIG. 1), and is baked. Thus, the primer layer 144 in which hollow particles are not dispersed is formed on the surface of the piston body 11 at the top 10a so as to have a predetermined thickness t5. Then, the first heat insulating layer 141 is formed on the surface of the primer layer 144 in the same manner as in the aforementioned first embodiment.

In the manufacturing process according to the second embodiment, a plurality of fine recesses 141c having a predetermined size is formed at predetermined intervals L1 on the surface of the first heat insulating layer 141 by laser processing in which a laser is irradiated. Thereafter, the modification processing is performed to blow a combustion flame mixed with an organic metallic compound (special modifier) containing Si onto the surface of the first heat insulating layer 141. At this time, the processing duration of blowing the combustion flame to the entire first heat insulating layer 141 is at least about 5 seconds and not more than about 50 seconds. Thus, the functional group that binds to the constituent component of the layer body 42a of the second heat insulating layer 142 is formed on the surface (the flat surface and the inner surfaces of the plurality of formed recesses 141c) of the first heat insulating layer 141 by the modification processing using an organic metallic compound.

Then, the second heat insulating layer 142 is formed on the surface of the first heat insulating layer 141 in the same manner as in the aforementioned first embodiment. At this time, a portion of the second heat insulating layer 142 enters the recesses 141c of the first heat insulating layer 141. Furthermore, the functional group formed on the surface of the first heat insulating layer 141 is incorporated into the covalent bond containing oxygen, and forms the covalent bond with the inorganic compound of the second heat insulating layer 142 or forms the hydrogen bond with the oxygen of the covalent bond of the second heat insulating layer 142.

Finally, the protective layer 143 is formed on the surface of the second heat insulating layer 142. Specifically, first, the scale-like inorganic solid particles 43b having a predetermined average particle diameter and the amino-based coupling agent are added to a water-based coating containing a predetermined alkoxide, and the mixture is stirred with a stirrer. At this time, when the weight of the water-based coating to which the scale-like inorganic solid particles 43b have been added is set to 100, the amino-based coupling agent is added such that the weight of the amino-based coupling agent is at least about 0.1% and not more than about 10%.

Then, the water-based coating containing the alkoxide and the amino-based coupling agent are applied onto the surface of the second heat insulating layer 142, and the heat treatment or the like is performed thereon. Thus, the protective layer 143 in which the scale-like inorganic solid particles 43b have been dispersed is formed on the surface of the second heat insulating layer 142. At this time, in the layer body 43a (inorganic compound) of the protective layer 143, the binder having the amino group is dispersed. The amino group of this binder forms a hydrogen bond with oxygen in the covalent bond (—X—O—Y—: X (Y) is, any of Si, Zr, Al, and Ce) containing oxygen, which is the constituent component of the protective layer 143, or forms a hydrogen bond with oxygen in the covalent bond (—X—O—Y—), which is the constituent component of the second heat insulating layer 142. Consequently, the piston 110 having the top 10a on which the coating layer 140 is formed as shown in FIG. 1 is manufactured.

Effects of Second Embodiment

According to the aforementioned second embodiment, the following effects can be obtained.

According to the second embodiment, as hereinabove described, the protective layer 143 including the layer body 43a made of the inorganic compound that includes the alkoxide and the scale-like inorganic solid particles 43b dispersed in the layer body 43a is formed on the first heat insulating layer 141 and the second heat insulating layer 142. Thus, similarly to the first embodiment, the first heat insulating layer 141 and the second heat insulating layer 142 can be maintained even in a high-temperature environment due to the protective layer 143, and hence high heat insulating properties can be ensured in the piston 110.

According to the second embodiment, in the inorganic compound (layer body 43a) of the protective layer 143, the amino group of the binder including the coupling agent forms the hydrogen bond with the oxygen in the covalent bond (—X—O—Y—), which is the constituent component of the second heat insulating layer 142. Thus, the adhesion strength between the protective layer 143 and the second heat insulating layer 142 can be improved, and hence the protective layer 143 and the second heat insulating layer 142 can more strongly adhere to each other.

According to the second embodiment, the functional group that binds to the constituent component of the second heat insulating layer 142 is provided on the surface of the first heat insulating layer 141 on the side of the second heat insulating layer 142 by the modification processing using an organic metallic compound. Thus, the adhesion strength between the first heat insulating layer 141 and the second heat insulating layer 142 containing the inorganic compound can be improved due to the functional group, and hence the first heat insulating layer 141 and the second heat insulating layer 142 can more strongly adhere to each other.

According to the second embodiment, the recesses 141c that the second heat insulating layer 142 enters are provided on the surface of the first heat insulating layer 141 on the side of the second heat insulating layer 142. Thus, the second heat insulating layer 142 enters the recesses 141c such that the adhesion strength between the first heat insulating layer 141 and the second heat insulating layer 142 can be improved. Thus, the first heat insulating layer 141 and the second heat insulating layer 142 can more strongly adhere to each other.

According to the second embodiment, the primer layer 144 including the layer body 144a in which neither hollow particles nor solid particles are dispersed is disposed on the surface of the piston body 11 between the piston body 11 and the first heat insulating layer 141. Thus, due to the primer layer 144, the direct contact of hollow particles and solid particles with the piston body 11 can be suppressed, and hence the adhesion area between the first heat insulating layer 141 and the piston body 11 through the primer layer 144 can be reliably increased.

According to the second embodiment, both the thickness t2 of the first heat insulating layer 141 and the thickness t3 of the second heat insulating layer 142 are greater than the thickness t4 of the protective layer 143, and are greater than the thickness t5 of the primer layer 144. Thus, the thickness t2 of the first heat insulating layer 141 and the thickness t3 of the second heat insulating layer 142 can be increased, and hence the heat insulating properties of the piston 110 can be reliably improved. The remaining effects of the second embodiment are similar to those of the aforementioned first embodiment.

Second Example

Tests (a cross-cut test, a cross-cut adhesion test, and an adhesion strength measurement test) on adhesion strength, conducted as a second example in order to confirm the effects of the second embodiment of the present invention, are now described with reference to FIGS. 6 to 9.

(Cross-Cut Test)
<Structures of Test Materials>

In the cross-cut test, the adhesion between the first heat insulating layer 141 and the second heat insulating layer 142 (see FIG. 6) according to the aforementioned second embodiment was confirmed. In this cross-cut test, first, a test material 1 in which the first heat insulating layer 141 and the second heat insulating layer 142 according to the aforementioned second embodiment were formed in this order on a predetermined base material made of a plate material of an aluminum alloy of AC8A-T6 was prepared as a test material. The composition of the AC8A-T6 is 11 mass % or more and 13 mass % or less of Si, 0.8 mass % or more and 1.3 mass % or less of Cu, 0.7 mass % or more and 1.3 mass % or less of Mg, 0.8 mass % or more and 1.5 mass % or less of Ni, 0.8 mass % or less of Fe, 0.15 mass % or less of Zn, 0.15 mass % or less of Mn, 0.20 mass % or less of Ti, 0.10 mass % or less of Cr, 0.05 mass % or less of Sn, 0.05 mass % or less of Pb, and the balance Al.

Specifically, the hollow particles 41b, the outer shells of which were made of silica, having an average particle diameter of 19.76 μm were added to the organic coating containing N-methyl-2-pyrrolidone, and the mixture was stirred with a stirrer. At this time, when the weight of the organic coating was set to 100, the hollow particles 41b were added to the organic coating such that the weight of the hollow particles 41b was 130%. Then, the organic coating, to which the hollow particles 41b had been added, was applied onto a surface of the predetermined base material, and was baked. Thus, the first heat insulating layer 141 including the layer body 41a made of the resin containing polyimide and a number of the hollow particles 41b dispersed in the layer body 41a was formed on the surface of the predetermined base material. In this case, the first heat insulating layer 141 was formed so as to have a thickness t1 of 100 μm.

Then, a plurality of fine recesses 141c (see FIG. 6) was formed on the surface of the first heat insulating layer 141 by the laser processing in which a laser was irradiated. The recesses 141c were formed so as to have an opening D1 of 30 μm and a depth H of 36 μm. Furthermore, the plurality of recesses 141c was formed at intervals L1 of 500 μm. Thereafter, the modification processing was performed to blow a combustion flame mixed with an organic metallic compound (special modifier) containing Si to the surface of the first heat insulating layer 141. The functional group that binds to the constituent component of the layer body 42a of the second heat insulating layer 142 was formed on the surface (the flat surface and the inner surfaces of the plurality of formed recesses 141c) of the first heat insulating layer 141 by this modification processing using an organic metallic compound. Finally, the second heat insulating layer 142 was formed on the surface of the first heat insulating layer 141 in the same manner as the second heat insulating layer 42 of Example 1 of the aforementioned first example. Thus, the test material 1 was prepared.

On the other hand, a test material 2 was prepared in the same manner as the test material 1 except that neither the laser processing nor the modification processing was performed.

Then, the cross-cut test was performed on the test materials 1 and 2. Specifically, in accordance with the old JIS K5400, a cut was formed in an X shape on the surface of the second heat insulating layer of each of the test materials 1 and 2. After that, an adhesive tape was strongly crimped to the cut portion, and thereafter the adhesive tape was peeled off at a stretch at a predetermined angle to observe the state of the X-shaped cut.

<Results of Cross-Cut Test>

Figure 7:
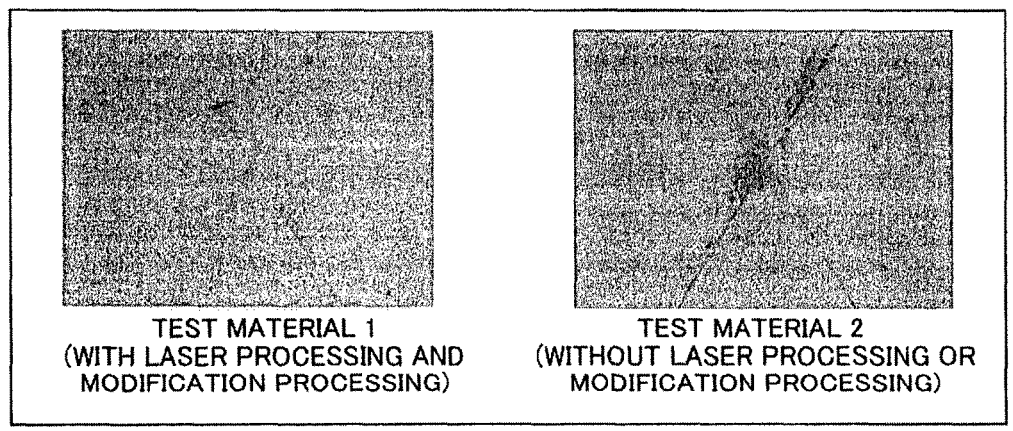
FIG. 7 Photographs showing the results of a cross-cut test in a second example conducted in order to confirm the effect of the present invention.

As results of the cross-cut test shown in FIG. 7, in the test material 1 on which the laser processing and the modification processing had been performed, almost no peeling of the second heat insulating layer was observed around the X-shaped cut. On the other hand, in the test material 2 on which neither the laser processing nor the modification processing had been performed, peeling of the second heat insulating layer was observed around the X-shaped cut. Thus, it has been confirmable that the first heat insulating layer 141 and the second heat insulating layer 142 more strongly adhere to each other in the test material 1. Consequently, it has been confirmable that the adhesion between the first heat insulating layer 141 and the second heat insulating layer 142 can be improved due to the recesses 141c formed by the laser processing and the functional group formed by performing the modification processing. Incidentally, the active functional group was formed in the resin containing polyimide having a low polarity on the surface of the first heat insulating layer 141 by the modification processing such that the wettability between the surface of the first heat insulating layer 141 and the water-based coating was improved, and thus the adhesion between the first heat insulating layer 141 and the second heat insulating layer 142 was conceivably improved.

(Cross-Cut Adhesion Test)
<Structures of Test Materials>

In the cross-cut adhesion test, the adhesion between the second heat insulating layer 142 and the protective layer 143 (see FIG. 6) according to the aforementioned second embodiment was confirmed. In this cross-cut adhesion test, first, as a test material, a test material 3 in which the second heat insulating layer 142 and the protective layer 143 according to the second embodiment were formed in this order on a predetermined base material made of a plate material of an aluminum alloy of AC8A-T6 was prepared. Specifically, similarly to the second heat insulating layer 42 of Example 1 of the aforementioned first example, the second heat insulating layer 142 was formed on a surface of the predetermined base material.

Then, the protective layer 143 was formed on the surface of the second heat insulating layer 142. Specifically, the inorganic solid particles 43b made of talc and having an average particle diameter of 5.61 μm and aminopropyltriethoxysilane as an amino-based coupling agent were added to the water-based coating containing the alkoxide, and the mixture was stirred with a stirrer. At this time, when the weight of the water-based coating to which the scale-like inorganic solid particles 43b had been added was set to 100, the amino-based coupling agent was added such that the weight of the amino-based coupling agent was 5%. Then, the water-based coating to which the inorganic solid particles 43b had been added was applied onto the surface of the second heat insulating layer 142, and the heat treatment was performed thereon. Thus, the protective layer 143 including the layer body 43a made of an inorganic compound mainly including silicic acid and zirconia and a number of the inorganic solid particles 43b dispersed in the layer body 43a, in which the binder having the amino group including the amino-based coupling agent had been dispersed, was formed on the surface of the second heat insulating layer 142. In this case, the protective layer 143 was formed so as to have a thickness t4 of 20 μm. Furthermore, the inorganic solid particles 43b were dispersed in the protective layer 143 so as to be 65 vol %. Thus, the test material 3 was prepared.

On the other hand, a test material 4 was prepared in the same manner as the test material 3 except that no amino-based coupling agent was added.

Then, the cross-cut adhesion test was performed on the test materials 3 and 4. Specifically, in accordance with the JIS K5600, a cut was formed in a grid pattern on the surface of the protective layer of each of the test materials 3 and 4. After that, an adhesive tape was strongly crimped to the cut portion, and thereafter the adhesive tape was peeled off at a stretch at a predetermined angle to observe the state of the grid-like cut.

<Results of Cross-Cut Adhesion Test>

Figure 8:
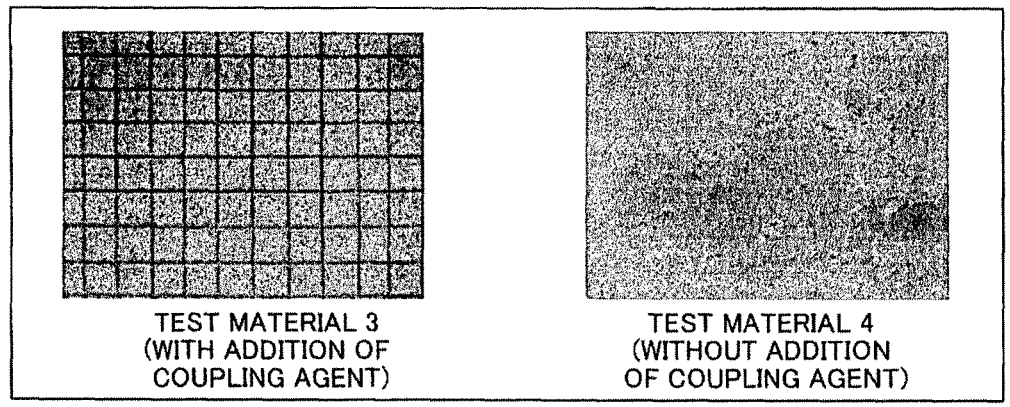
FIG. 8 Photographs showing the results of a cross-cut adhesion test in a second example conducted in order to confirm the effect of the present invention.

As results of the cross-cut adhesion test shown in FIG. 8, in the test material 3 to which the amino-based coupling agent had been added, almost no peeling of the protective layer was observed around the grid-like cut, and the grid-like cut was clearly confirmed. On the other hand, in the test material 4 to which no amino-based coupling agent had been added, the protective layer was peeled off to the extent that the grid-like cut could not be confirmed. Thus, it has been confirmable that the second heat insulating layer 142 and the protective layer 143 more strongly adhere to each other in the test material 3. Consequently, it has been confirmable that the adhesion between the second heat insulating layer 142 and the protective layer 143 can be improved due to the binder having the amino group formed by adding the amino-based coupling agent.

(Adhesion Strength Measurement Test)
<Structures of Test Materials>

In the adhesion strength measurement test, the adhesion strength on each interface was concretely confirmed. In this adhesion strength measurement test, first, the same test materials as the test materials 1 to 4 used in the aforementioned cross-cut test and cross-cut adhesion test were used as test materials. Furthermore, a test material 1a was prepared in the same manner as the test material 1 except that only the laser processing was performed but no modification processing was performed. Furthermore, a test material 1b was prepared in the same manner as the test material 1 except that only the modification processing was performed but no laser processing was performed. Furthermore, test materials 5a, 5b, 5c, and 5d were prepared in the same manner as the test material 3 except that instead of the amino-based coupling agent, vinyl trimethoxysilane was added as a vinyl-based coupling agent, glycidoxypropyl trimethoxysilane was added as an epoxy-based coupling agent, methacryloxypropyltrimethoxysilane was added as a methacryl-based coupling agent, and isocyanatopropyltrimethoxysilane was added as an isocyanate-based coupling agent.

Furthermore, in order to confirm the adhesion between the piston body 11 and the first heat insulating layer 141 (see FIG. 6) through the primer layer 144 according to the aforementioned second embodiment, a test material 6 in which the primer layer 144 and the first heat insulating layer 141 were formed in this order on a predetermined base material was prepared as a test material. Specifically, the primer layer 144 according to the aforementioned second embodiment was formed on a surface of the predetermined base material made of a plate material of an aluminum alloy of AC8A-T6, corresponding to the piston body 11. Specifically, the organic coating containing N-methyl-2-pyrrolidone was applied onto the surface of the predetermined base material, and was baked. Thus, the primer layer 144 including the layer body 143a made of the resin containing polyimide but not including hollow particles and solid particles was formed on the surface of the predetermined base material. In this case, the primer layer 144 was formed so as to have a thickness t5 of 15 μm. Thereafter, the first heat insulating layer 141 was formed on the surface of the primer layer 144 in the same manner as the first heat insulating layer 41 of Example 1 of the aforementioned first example. Thus, the test material 6 was prepared.

On the other hand, a test material 7 was prepared in the same manner as the test material 6 except that no primer layer was formed.

In this adhesion strength measurement test, milling was performed on a region where a predetermined layer(s) (the primer layer, the first heat insulating layer, and/or the second heat insulating layer) of the predetermined base material was formed such that the surface roughness (Ra) was in the range of 6 to 10, and an alumite treatment without sealing processing was performed. Furthermore, grooves having a depth of about 1 mm were circumferentially formed in surfaces of outermost layers (the first heat insulating layers, the second heat insulating layers, or the protective layers) of the test materials 1 to 6, 1a, 1b, and 5a to 5d.

Then, the adhesion strength measurement test was performed on the test materials 1 to 6, 1a, 1b, and 5a to 5d with a thin film adhesion strength measuring apparatus. Specifically, the bottom of a cylindrical pin (outer diameter: 7.1 mm) of the thin film adhesion strength measuring apparatus was bonded in regions surrounded by the grooves formed in the surfaces of the outermost layers of the test materials. Then, the outermost layers of the test materials were peeled off by pulling up the thin film adhesion strength measuring apparatus at a constant speed (20 mm/sec) while applying a tensile load of 1030 N. Then, the strength (MPa) at the time when the outermost layers were peeled off was set as the adhesion strength.

Furthermore, a test material 8 was prepared in the same manner as in Example 3 except that the weight (additive amount) of the amino-based coupling agent was changed by 0.1% from 0% to 10% when the weight of the water-based coating to which the scale-like inorganic solid particles 43b had been added was set to 100, the adhesion strength was measured, and a change in adhesion strength was plotted as a graph.

<Results of Adhesion Strength Test>

TABLE 2

INTERFACE BETWEEN FIRST HEAT INSULATING LAYER AND SECOND HEAT INSULATING LAYER

| PROCESSING | ADHESION STRENGTH WITH OR WITHOUT PROCESSING | |
|---|---|---|
| | WITHOUT (TEST MATERIAL 2) | WITH |
| LASER PROCESSING ONLY | 0~1 MPa | 3~4 MPa (TEST MATERIAL 1a) |
| MODIFICATION PROCESSING ONLY | 0~1 MPa | 3~4 MPa (TEST MATERIAL 1b) |
| LASER PROCESSING + MODIFICATION PROCESSING | 0~1 MPa | 6~7 MPa (TEST MATERIAL 1) |

TABLE 3

INTERFACE BETWEEN SECOND HEAT INSULATING LAYER AND PROTECTIVE LAYER

| TYPES OF COUPLING AGENTS | ADHESION STRENGTH WITH OR WITHOUT ADDITION | |
|---|---|---|
| | WITHOUT (TEST MATERIAL 4) | WITH |
| VINYL-BASED | 0~1 MPa | 3~4 MPa (TEST MATERIAL 5a) |
| EPOXY-BASED | 0~1 MPa | 3~4 MPa (TEST MATERIAL 5b) |
| METHACRYL-BASED | 0~1 MPa | 3~4 MPa (TEST MATERIAL 5c) |
| ISOCYANATE-BASED | 0~1 MPa | 3~4 MPa (TEST MATERIAL 5d) |
| AMINO-BASED | 0~1 MPa | 10~11 MPa (TEST MATERIAL 3) |

TABLE 4

INTERFACE BETWEEN BASE MATERIAL AND FIRST HEAT INSULATING LAYER ADHESION STRENGTH WITH OR WITHOUT PRIMER LAYER FORMATION

| WITHOUT (TEST MATERIAL 7) | WITH (TEST MATERIAL 6) |
|---|---|
| 5~6 MPa | 16~20 MPa |

As results of the adhesion strength test (the adhesion strength test of the test materials 1, 1a, 1b, and 2) on the interface between the first heat insulating layer and the second heat insulating layer shown in Table 2, the adhesion strength of each of the test materials 1, 1a, and 1b on which at least one of the laser processing and the modification processing had been performed was obviously larger than the adhesion strength of the test material 2 on which neither the laser processing nor the modification processing had been performed. Furthermore, the adhesion strength of the test material 1 on which both the laser processing and the modification processing had been performed was about twice larger than the adhesion strength of each of the test materials 1a and 1b on which only one of the laser processing and the modification processing had been performed. Thus, it has been confirmable that the adhesion strength between the first heat insulating layer and the second heat insulating layer can be improved due to the recesses formed by the laser processing and the functional group formed by the modification processing, and both the recesses and the functional group are formed such that a twofold increase in adhesion strength is obtained as compared with the case where either the recesses or the functional group is formed.

As results of the adhesion strength test (the adhesion strength test of the test materials 3, 4, and 5a to 5d) on the interface between the second heat insulating layer and the protective layer shown in Table 3, the adhesion strength of each of the test materials 3 and 5a to 5d in which any of the coupling agents had been added to the protective layers was obviously larger than the adhesion strength of the test material 4 in which no coupling agent had been added to the protective layer. Furthermore, the adhesion strength of the test material 3 in which the amino-based coupling agent had been added to the protective layer was about three times larger than the adhesion strength of each of the test materials 5a to 5d in which the remaining vinyl-based, epoxy-based, methacryl-based, and isocyanate-based coupling agents had been added to the protective layers, respectively. Thus, it has been confirmable that the adhesion strength between the second heat insulating layer and the protective layer can be improved due to the binder including the coupling agent and having the functional group (an amino group (—NH$_2$), a vinyl group (—CH=CH$_2$), an epoxy group (3-membered ring ether), a methacrylic group (CH$_2$=C(CH$_3$)—CO—), or an isocyanate group (—N=C=O)), and a particularly high adhesion strength is obtained due to the binder having an amino group. Incidentally, the amino group is a polar group, and can form a hydrogen bond with various elements, and hence the adhesion between the second heat insulating layer and the protective layer was conceivably further improved.

As results of the adhesion strength test (the adhesion strength test of the test materials 6 and 7) on the interface between the predetermined base material (piston body) and the first heat insulating layer shown in Table 4, the adhesion strength of the test material 6 in which the primer layer was formed on the interface between the predetermined base material and the first heat insulating layer was about three times larger than the adhesion strength of the test material 7 in which no primer layer was formed. Thus, it has been confirmable that the primer layer is provided between the predetermined base material and the first heat insulating layer such that the adhesion area between the predetermined base material and the first heat insulating layer is increased, and hence the adhesion between the predetermined base material and the first heat insulating layer can be further improved.

Figure 9:
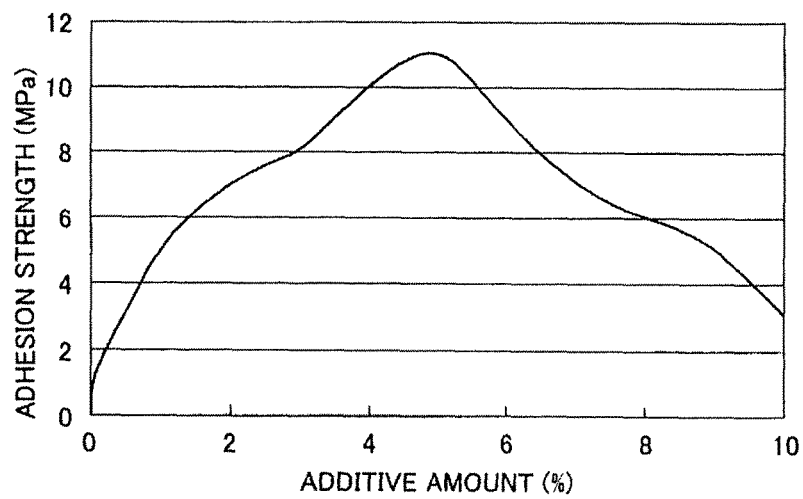
FIG. 9 A graph showing a change in adhesion strength when an additive amount of an amino-based coupling agent in the second example conducted in order to confirm the effect of the present invention is changed.

Furthermore, it has been confirmable from a graph showing a change in the adhesion strength of the test material 8 shown in FIG. 9 that the amino-based coupling agent is added to the water-based coating in a weight ratio of at least 0.1% and not more than 10% such that the adhesion strength between the second heat insulating layer and the protective layer can be improved. It has also been confirmable that the amino-based coupling agent is added to the water-based coating in a weight ratio of at least 3% and not more than 6% such that the adhesion strength between the second heat insulating layer and the protective layer can be increased to 8 MPa or more.

Third Embodiment

The structure of a piston 210 according to a third embodiment of the present invention is now described with reference to FIGS. 1 and 10 to 12. In this third embodiment, the piston 210 in which voids 243c are formed in a protective layer 243 is described as an example. The same structures as those of the aforementioned first embodiment are denoted by the same reference numerals, and description thereof is omitted. The piston 210 is an example of a "vehicle mechanical component" in the present invention.

(Structure of Piston)

Figure 10:
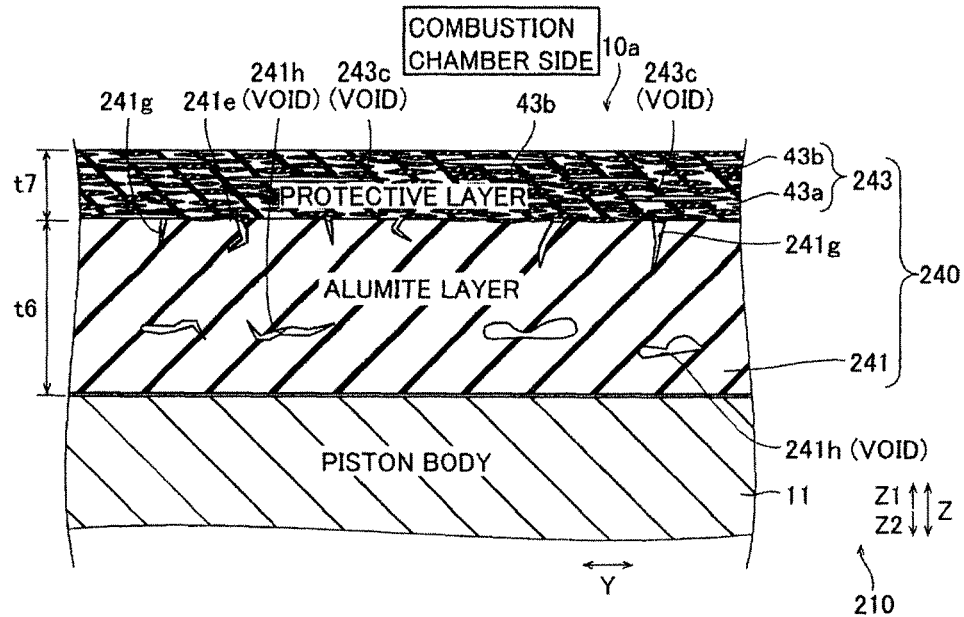
FIG. 10 An enlarged sectional view showing the vicinity of a coating layer according to the third embodiment of the present invention.

As shown in FIGS. 1 and 10, the piston 210 according to the third embodiment of the present invention includes a piston body 11 made of an aluminum alloy and a coating layer 240 having high heat insulating properties (low thermal conductivity).

<Structure of Coating Layer>

Figure 11:
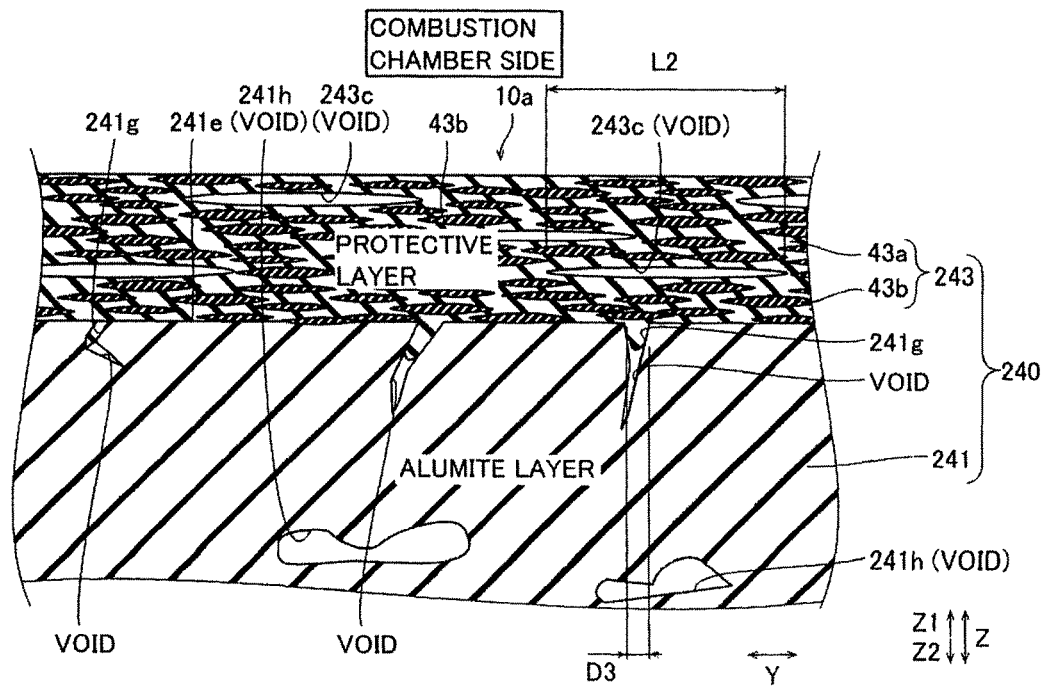
FIG. 11 An enlarged sectional view showing the vicinity of an interface between an alumite layer and a protective layer according to the third embodiment of the present invention.

According to the third embodiment, as shown in FIGS. 10 and 11, the coating layer 240 has a two-layer structure including an alumite layer 241 formed on a surface of the piston body 11 at a top 10a and the protective layer 243 formed on a surface 241e of the alumite layer 241. The alumite layer 241 is an example of a "heat insulating layer" or an "anodized coating layer" in the present invention.

The alumite layer 241 is formed by performing anodization of a chemical conversion treatment on the aluminum alloy constituting the piston body 11. That is, the alumite layer 241 mainly includes an oxide (alumina) of aluminum having a smaller thermal conductivity than the aluminum alloy. Thus, the alumite layer 241 has higher heat insulating properties than the piston body 11 made of an aluminum alloy. Furthermore, the piston body 11 and the alumite layer 241 are integrally formed such that the adhesion strength between the piston body 11 and the alumite layer 241 is large.

The protective layer 243 includes a layer body 43a that mainly forms the protective layer 243 and scale-like inorganic solid particles 43b dispersed in the layer body 43a.

Figure 12:
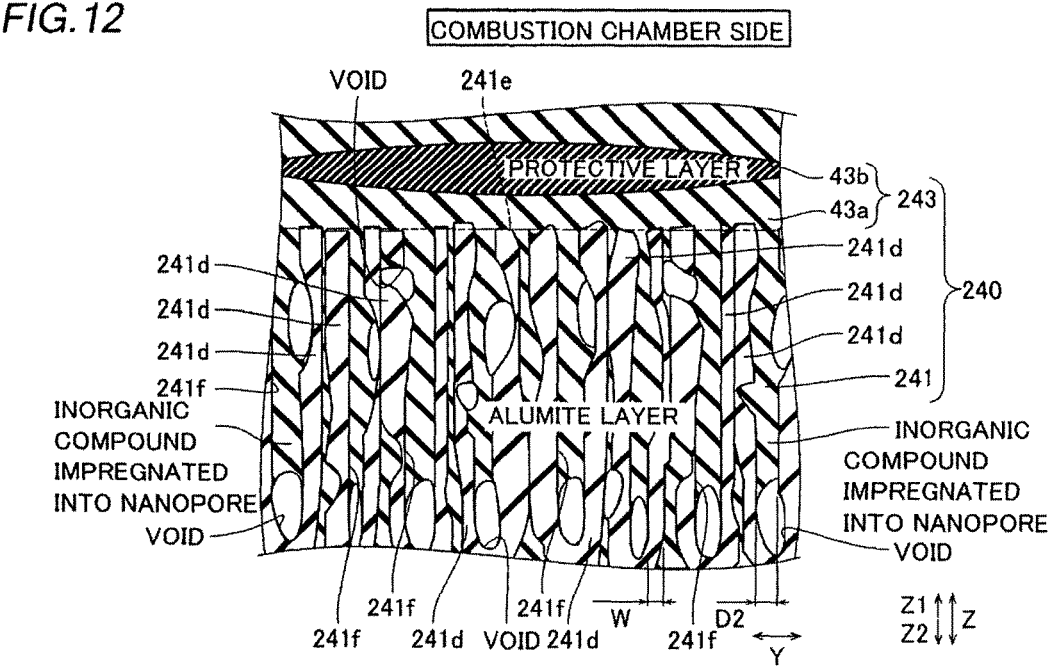
FIG. 12 A sectional view showing the vicinity of the interface between the alumite layer and the protective layer according to the third embodiment of the present invention and further enlarged than FIG. 11.

In the alumite layer 241, a number of fine cells 241d mainly made of alumina extend in a thickness direction (direction Z) from the surface 241e of the alumite layer 241 on the side of the protective layer 243 (Z1 side) toward a Z2 side, as shown in FIG. 12. In addition, nanopores 241f having a nanometer-sized pore diameter D2 are formed between the cells 241d. These nanopores 241f extend in the thickness direction from the surface 241e. The diameter W of the cells 241d is at least about 25 nm and not more than about 300 nm, and preferably at least about 50 nm and not more than about 300 nm. The pore diameter D2 of the nanopores 241f is at least about 10 nm and not more than about 350 nm, and preferably at least about 50 nm and not more than about 250 nm.

As shown in FIG. 10, in the alumite layer 241, micropores 241g extending in the thickness direction from the surface 241e and in-layer micropores 241h formed in the alumite layer 241 and not communicating with the micropores 241g are formed. These micropores 241g have a micrometer-sized pore diameter D3. Specifically, the pore diameter D3 is at least about 1 μm and not more than about 3 μm.

In the alumite layer 241, the proportion (pore abundance ratio) of the total of the nanopores 241f, the micropores 241g, and the in-layer micropores 241h is at least about 5% and not more than about 80%. The pore abundance ratio (%) can be calculated by dividing an area occupied by the total of the nanopores 241f, the micropores 241g, and the in-layer micropores 241h of the alumite layer 241 on a predetermined cross-section of the alumite layer 241 by the area of the predetermined cross-section and multiplying it by 100.

As shown in FIGS. 11 and 12, an inorganic compound constituting the layer body 43a of the protective layer 243 is impregnated into (enters) a portion of the nanopores 241f and a portion of the micropores 241g of the alumite layer 241. Thus, the alumite layer 241 is protected by the inorganic compound of the protective layer 243 such that embrittlement of the alumite layer 241 is suppressed, and the adhesion strength between the alumite layer 241 and the protective layer 243 is improved. The hardness of the alumite layer 241 is also improved.

In the nanopores 241f, the inorganic compound is mainly impregnated so as to fill the entire nanopores 241f. On the other hand, in the micropores 241g, the inorganic compound is mainly impregnated only into the micropores 241g in the vicinity of the surface 241e. This is because a liquid (water-based coating described below) is more likely to flow through the nanopores 241f than the micropores 241g due to its capillarity.

On the other hand, the remaining portion of the nanopores 241f into which the inorganic compound is not impregnated and the remaining portion of the micropores 241g into which the inorganic compound is not impregnated are voids. Furthermore, the inorganic compound is not impregnated into the in-layer micropores 241h, and the in-layer micropores 241h are voids. The thermal conductivity of the voids formed in the alumite layer 241 is small such that the heat insulating properties of the alumite layer 241 is improved.

The percentage (void content) of the micropores 241g into which the inorganic compound is impregnated of the micropores 241g formed in the alumite layer 241 is larger than the percentage (void content) of the nanopores 241f into which the inorganic compound is impregnated of the nanopores 241f formed in the alumite layer 241. The void content (%) denotes a value obtained by dividing a cross-sectional area occupied by the inorganic compound present in the micropores 241g (nanopores 241f) by the cross-sectional area of the micropores 241g (nanopores 241f) on a predetermined cross-section of the alumite layer 241 and multiplying it by 100.

The void content of the micropores 241g is preferably at least about 30% and not more than about 45%. On the other hand, the void content of the nanopores 241f is preferably at least about 10% and not more than about 20%.

As shown in FIG. 10, the thickness t6 of the alumite layer 241 is at least about 10 μm and not more than about 1000 μm. The thickness t6 of the alumite layer 241 is preferably at least about 30 μm. Thus, the heat insulating properties of the alumite layer 241 can be sufficiently ensured. The thickness t6 of the alumite layer 241 is preferably not more than about 500 μm, and more preferably not more than about 200 μm. Thus, an increase in the formation time of the alumite layer 241 can be suppressed.

In the protective layer 243, the layer body 43a made of the inorganic compound is located between layers of the scale-like inorganic solid particles 43b stacked in the thickness direction (direction Z) such that the protective layer 243 is formed.

According to the third embodiment, a plurality of voids 243c extending in a transverse direction (direction Y) perpendicular to the thickness direction (direction Z) is formed in the protective layer 243, as shown in FIG. 11. These voids 243c are formed between the layers of the scale-like inorganic solid particles 43b in which the layer body 43a is not disposed. The heat insulating properties at the protective layer 243 are improved due to these voids 243c. The percentage (porosity) of the voids 243c in the protective layer 243 is at least about 1.5% and not more than about 5%. The porosity at the protective layer 243 is not more than about 5%, which is sufficiently small, such that occurrence of cracks in the protective layer 243 can be sufficiently suppressed. Incidentally, the voids 243c are only required to extend in the transverse direction as a whole. In other words, the voids 243 may slightly have portions extending in the thickness direction.

The length L2 of the voids 243c in the transverse direction (direction Y) perpendicular to the thickness direction (direction Z) is preferably about 5 μm or more. The length L2 of the voids 243c is preferably equal to or greater than the average particle diameter of the scale-like inorganic solid particles 43b.

The thickness t7 of the protective layer 243 is at least about 10 μm and not more than about 500 μm. The thickness t7 of the protective layer 243 is set to at least about 10 μm such that the heat resistance at the protective layer 243 can be reliably maintained. The thickness t7 of the protective layer 243 is set to not more than about 500 μm such that concentration of stresses in the protective layer 243 can be suppressed. The thickness t7 of the protective layer 243 is preferably not more than about 300 μm. Thus, concentration of stresses in the protective layer 243 can be effectively suppressed, and hence the good protective layer 243 can be maintained.

Similarly to the second embodiment, a binder having an amino group (—NH$_2$) may be dispersed in the inorganic compound of the layer body 43a including an alkoxide.

The heat resistance of the coating layer 240 is about 1000° C., and even at the top 10a of the piston body 11 where the temperature becomes high when the piston 210 is placed in an internal combustion engine 100, the physical properties can be sufficiently maintained. The thermal conductivity of the coating layer 240 is preferably about 0.6 W/m·K or less, and more preferably about 0.5 W/m·K or less. The specific heat of the coating layer 240 per unit volume is preferably about 1900 kJ/m$^3$·K or less, and more preferably about 1800 kJ/m$^3$·K. Furthermore, the specific heat of the coating layer 240 per unit volume is still more preferably about 1700 kJ/m$^3$·K or less. The remaining structures of the third embodiment are similar to those of the aforementioned first embodiment.

(Process for Manufacturing Piston)

A process for manufacturing the piston 210, in which the coating layer 240 is formed, according to the third embodiment of the present invention is now described with reference to FIGS. 1 and 10 to 15.

Figure 13:
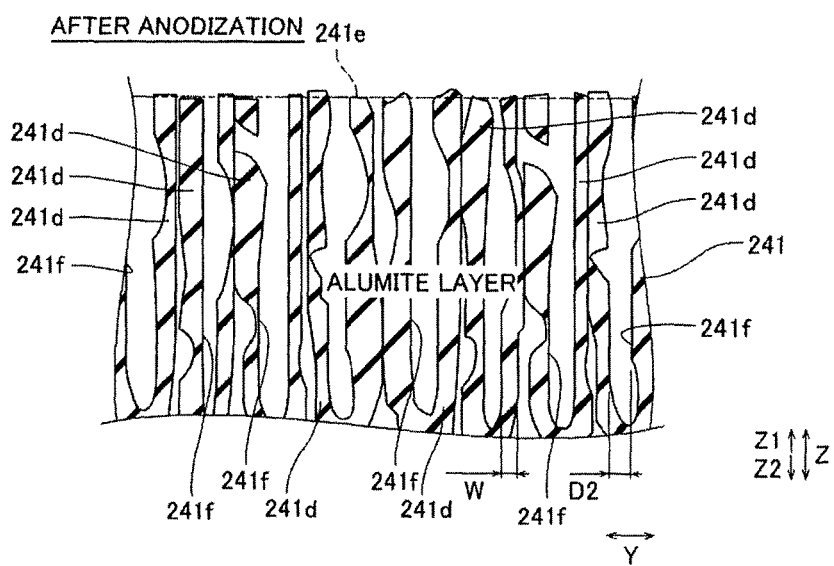
FIG. 13 An enlarged sectional view showing the alumite layer in a process for manufacturing a piston according to the third embodiment of the present invention.

First, the piston body 11 is prepared. Then, anodization is performed as a chemical conversion treatment on the surface of the piston body 11 at the top 10a (see FIG. 1). Specifically, the piston body 11 is placed in a treatment liquid containing an acid such as sulfuric acid, oxalic acid, or phosphoric acid in a state where a surface other than the surface of the piston body 11 at the top 10a is masked. Then, in a state where the treatment liquid is maintained at a predetermined temperature, a predetermined voltage is applied for a predetermined time between an electrode (not shown) disposed in the treatment liquid and the piston body 11. Thus, as shown in FIG. 13, aluminum on the surface of the piston body 11 is oxidized, and the alumite layer 241 is formed on the surface of the piston body 11. At this time, the nanopores 241f is formed in the alumite layer 241 so as to extend in the thickness direction (direction Z). Furthermore, due to migration of a solid solution, an additive, or the like of an alloy constituent (additive element) other than aluminum of the aluminum alloy into the treatment liquid, for example, the micropores 241g and the in-layer micropores 241h are formed in the alumite layer 241, as shown in FIG. 11.

Figure 14:
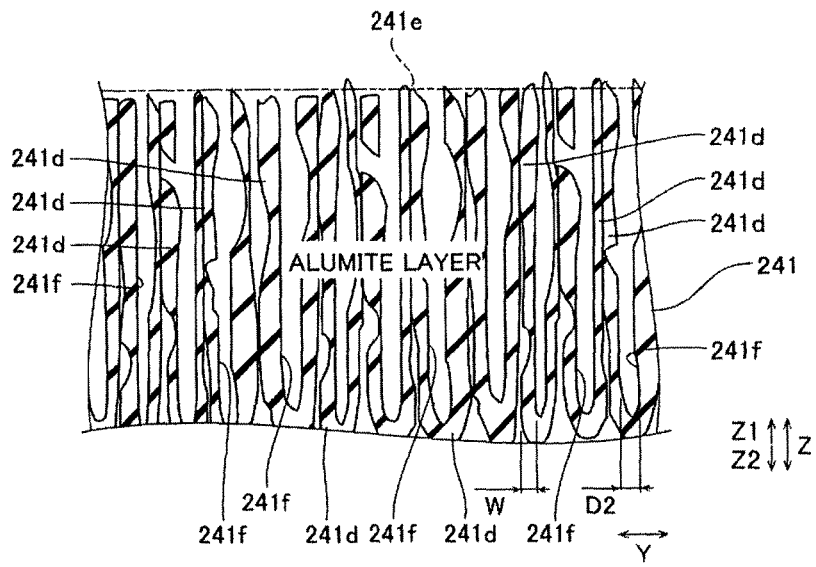
FIG. 14 An enlarged sectional view showing an alumite layer formed under different conditions from FIG. 13 in the process for manufacturing the piston according to the third embodiment of the present invention.

Incidentally, processing for increasing the pore diameter D2 of the nanopores 241f and the pore diameter D3 of the micropores 241g may be performed after the aforementioned anodization. This processing for increasing the pore diameters is performed by immersing the piston body 11 in the treatment liquid containing an acid such as phosphoric acid for a predetermined time. The presence or absence of this processing for increasing the pore diameters, the type and concentration of the acid in the treatment liquid, the temperature of the treatment liquid, the treatment time, the voltage value, etc. are adjusted at the time of anodization such that the pore abundance ratio of the alumite layer 241 can be adjusted. Furthermore, as shown in FIG. 13, the alumite layer 241 may be formed such that the pore diameter D2 of the nanopores 241f is increased, or as shown in FIG. 14, the alumite layer 241 may be formed such that the pore diameter D2 of the nanopores 241f is reduced.

Then, as shown in FIG. 12, the protective layer 243 is formed on the surface 241e of the alumite layer 241. Specifically, first, the scale-like inorganic solid particles 43b having a predetermined average particle diameter and a predetermined solvent (isopropyl alcohol or polyethylene glycol, for example) are added to the water-based coating containing a predetermined alkoxide, and the mixture is stirred with a stirrer. At this time, an amino-based coupling agent may be added to the water-based coating. In this case, the amino-based coupling agent is preferably added to the water-based coating such that the weight ratio of the amino-based coupling agent is at least about 0.1% and not more than about 10%.

According to the third embodiment, the viscosity of the water-based coating is adjusted by adjusting the amount of solvent added to the water-based coating. The viscosity of the water-based coating is preferably at least about 5 mPa·s and not more than about 15 mPa·s. When the weight of the water-based coating to which the scale-like inorganic solid particles 43b have been added is set to 100, the solvent is added such that the weight of the solvent is at least about 20% and not more than about 50%.

Then, the water-based coating, the viscosity of which has been adjusted, is applied onto the surface 241e of the alumite layer 241, and a heat treatment or the like is performed thereon. Thus, the protective layer 243 in which the scale-like inorganic solid particles 43b have been dispersed is formed on the surface 241e of the alumite layer 241. At this time, the scale-like inorganic solid particles 43b are stacked in layers such that the layer body 43a (inorganic compound) is located between the layers of the inorganic solid particles 43b, as shown in FIG. 11. Thus, the strong protective layer 243 is constituted by the layer body 43a and the inorganic solid particles 43b. The plurality of voids 243c extending in the transverse direction (direction Y) perpendicular to the thickness direction (direction Z) are formed in a region between the layers of the inorganic solid particles 43b, in which the layer body 43a is not located.

Furthermore, liquid components other than the scale-like inorganic solid particles 43b of the water-based coating are impregnated into the nanopores 241f and the micropores 241g of the alumite layer 241. In the nanopores 241f, the water-based coating largely migrates due to its capillarity, and thus the water-based coating is likely to be impregnated so as to fill the entire nanopores 241f. On the other hand, in the micropores 241g having a larger pore diameter than the nanopores 241f, the water-based coating slightly migrates due to its capillarity. Therefore, the water-based coating is unlikely to be impregnated so as to fill the entire micropores 241g. Consequently, the percentage (void content) of the micropores 241g that the inorganic compound derived from the water-based coating enters of the micropores 241g formed in the alumite layer 241 is larger than the percentage (void content) of the nanopores 241f that the inorganic compound enters of the nanopores 241f formed in the alumite layer 241.

Figure 15:
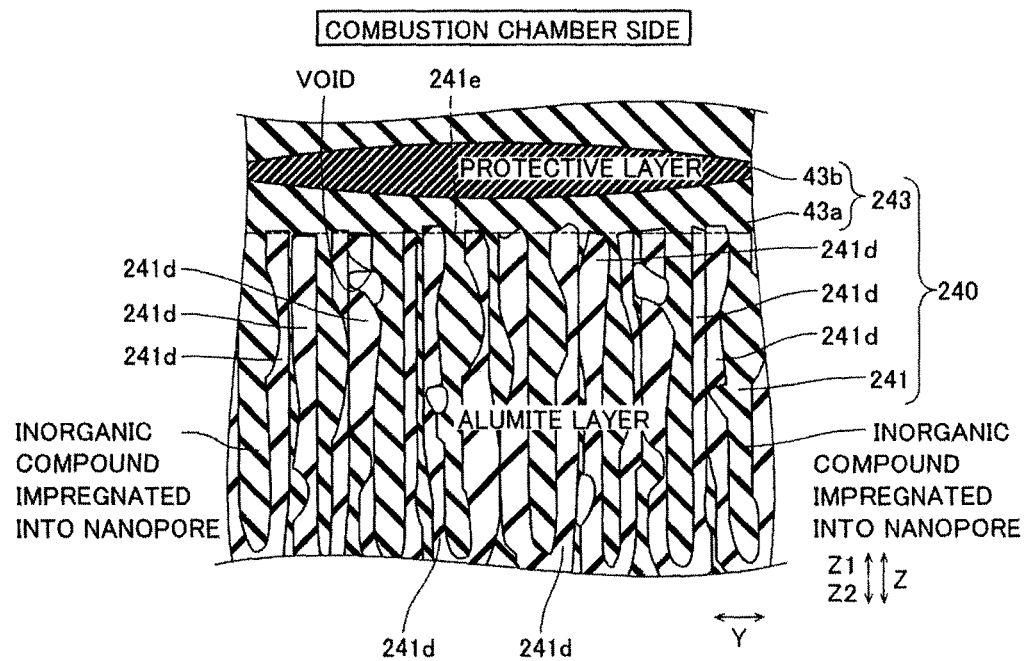
FIG. 15 A sectional view showing the vicinity of an interface between an alumite layer formed under different conditions from FIG. 12 and the protective layer in the process for manufacturing the piston according to the third embodiment of the present invention.

Furthermore, when the viscosity of the water-based coating is adjusted to be as large as about 15 mPa·s, for example, the water-based coating is unlikely to migrate inside the nanopores 241f and the micropores 241g. Thus, as shown in FIG. 12, the percentage (void content) of the voids that the inorganic compound does not enter is increased in the nanopores 241f and the micropores 241g. When the viscosity of the water-based coating is adjusted to be as small as about 5 mPa·s, on the other hand, the water-based coating is likely to migrate inside the nanopores 241f and the micropores 241g. Thus, as shown in FIG. 15, the percentage (void content) of the voids that the inorganic compound does not enter is reduced in the nanopores 241f and the micropores 241g. The viscosity of the water-based coating may be more than about 15 mPa·s or less than about 5 mPa·s.

When an amino-based coupling agent is added to the water-based coating, the binder having an amino group is dispersed in the layer body 43a (inorganic compound) of the protective layer 243.

The amino group of this binder forms a hydrogen bond with oxygen in the covalent bond (—X—O—Y—: X (Y) is, any of Si, Zr, Al, and Ce) containing oxygen, which is a constituent component of the protective layer 243, or forms a hydrogen bond with oxygen in the covalent bond (—Al—O—Al—) of alumina constituting the alumite layer 241. Consequently, the piston 210 having the top 10a on which the coating layer 240 is formed as shown in FIG. 1 is manufactured.

Effects of Third Embodiment

According to the aforementioned third embodiment, the following effects can be obtained.

According to the third embodiment, as hereinabove described, the protective layer 243 including the layer body 43a made of the inorganic compound that includes an alkoxide and the scale-like inorganic solid particles 43b dispersed in the layer body 43a is formed on the alumite layer 241. Thus, similarly to the first embodiment, the alumite layer 241 can be maintained even in a high-temperature environment due to the protective layer 243, and hence high heat insulating properties can be ensured in the piston 210.

According to the third embodiment, the plurality of voids 243c extending in the transverse direction (direction Y) perpendicular to the thickness direction (direction Z) is provided in the protective layer 243. Thus, the heat insulating properties at the protective layer 243 can be improved due to the voids 243c having a small thermal conductivity, and hence high heat insulating properties can be ensured in the piston 210 due to not only the alumite layer 241 but also the protective layer 243. Furthermore, the voids 243c are elongated in the transverse direction such that the voids 243c having a small thermal conductivity can be located over a wider range of the protective layer 243 in the transverse direction as compared with voids elongated in the thickness direction, and hence the thermal conductivity of the protective layer 243 can be reduced over a wide range.

According to the third embodiment, the voids 243c are formed between the layers of the scale-like inorganic solid particles 43b stacked in the protective layer 243. Thus, the transversely elongated voids 243c can be easily formed in the protective layer 243 without being inhibited by the scale-like inorganic solid particles 43b.

According to the third embodiment, the inorganic compound is impregnated into the micropores 241g and the nanopores 241f such that the inorganic compound impregnated into the micropores 241g and the nanopores 241f and the inorganic compound of the protective layer 243 can be integrated with each other, and hence embrittlement of the alumite layer 241 can be suppressed, and the alumite layer 241 and the protective layer 243 can strongly adhere to each other.

According to the third embodiment, the void content of the micropores 241g is larger than the void content of the nanopores 241f. Thus, the void content of the micropores 241g is larger than the void content of the nanopores 241f such that the void content of the micropores 241g can be increased to reduce the thermal conductivity of the alumite layer 241 while the void content of the nanopores 241f is relatively reduced to maintain the hardness of the alumite layer 241. The remaining effects of the third embodiment are similar to those of the aforementioned first embodiment.

Third Example

A performance test of the piston 210 conducted as an example (third example) of the aforementioned third embodiment is now described with reference to FIG. 1 and FIGS. 10 to 17.

Characteristic Evaluation

Structures of Examples and Comparative Examples

First, the piston 210 (see FIG. 1) of Example 3 was prepared. As the aluminum alloy constituting the piston body 11, the same aluminum alloy as the aluminum alloy equivalent to AC8A-T6 used in the aforementioned first example was used and formed into a predetermined shape by casting.

Then, as shown in FIGS. 10 and 11, the alumite layer 241 was formed on the surface of the piston body 11 at the top 10a. Specifically, the piston body 11 was placed in an oxalic acid solution (treatment liquid) of 30 g/L in a state where a surface other than the surface of the piston body 11 at the top 10a was masked. Then, in a state where the treatment liquid was maintained at 18° C., a constant voltage of 100 V was applied for two hours between an electrode (not shown) disposed in the treatment liquid and the piston body 11. Thus, aluminum on the surface of the piston body 11 was oxidized, and the alumite layer 241 was formed on the surface of the piston body 11. At this time, the alumite layer 241 was formed such that the thickness t6 thereof was in the range of 50 to 60 μm.

Thereafter, as shown in FIGS. 10 to 12, the protective layer 243 was formed on the surface 241e of the alumite layer 241. Specifically, first, the inorganic solid particles 43b made of mica and having an average particle diameter of 5.82 μm and isopropyl alcohol were added to the water-based coating containing a silicon alkoxide and a zirconium alkoxide as alkoxides, and the mixture was stirred with a stirrer. At this time, the viscosity of the water-based coating after stirring was adjusted to be 5 mPa·s. Then, the water-based coating to which the inorganic solid particles 43b had been added was applied onto the surface 241e of the alumite layer 241, and the heat treatment was performed thereon. Thus, the protective layer 243 including the layer body 43a made of the inorganic compound mainly including silicic acid and zirconia and a number of the inorganic solid particles 43b dispersed in the layer body 43a was formed on the surface 241e of the alumite layer 241. At this time, the protective layer 243 was formed such that the thickness t7 thereof was in the range of 20 to 30 μm. Furthermore, the inorganic solid particles 43b were dispersed in the protective layer 243 to be 65 vol %. Thus, the piston 210 of Example 3 was prepared.

On the other hand, as comparative examples, the pistons of Comparative Examples 3 and 4 of the aforementioned first example were used. Furthermore, a piston of Comparative Example 5 was prepared. Unlike the piston 210 of Example 3, the piston of Comparative Example 5 has no protective layer. That is, in the piston of Comparative Example 5, an alumite layer was formed such that the thickness thereof was in the range of 50 to 60 μm while no protective layer was formed.

Then, the cross-section of the formed piston 210 of Example 3 was observed. In a sectional photograph shown in FIG. 16, it has been confirmable that the micropores 241g and the in-layer micropores 241h are formed in the alumite layer 241. It has also been confirmable that the inorganic compound constituting the protective layer 243 is not impregnated into a portion of the micropores 241g and the in-layer micropores 241h, and thus the voids are formed in the alumite layer 241. It has also been confirmable that in the protective layer 243, the voids 243c are formed between the layers of the scale-like inorganic solid particles 43b stacked in layers. The heat insulating properties of the coating layer 240 are conceivably improved due to these voids.

Figure 16:
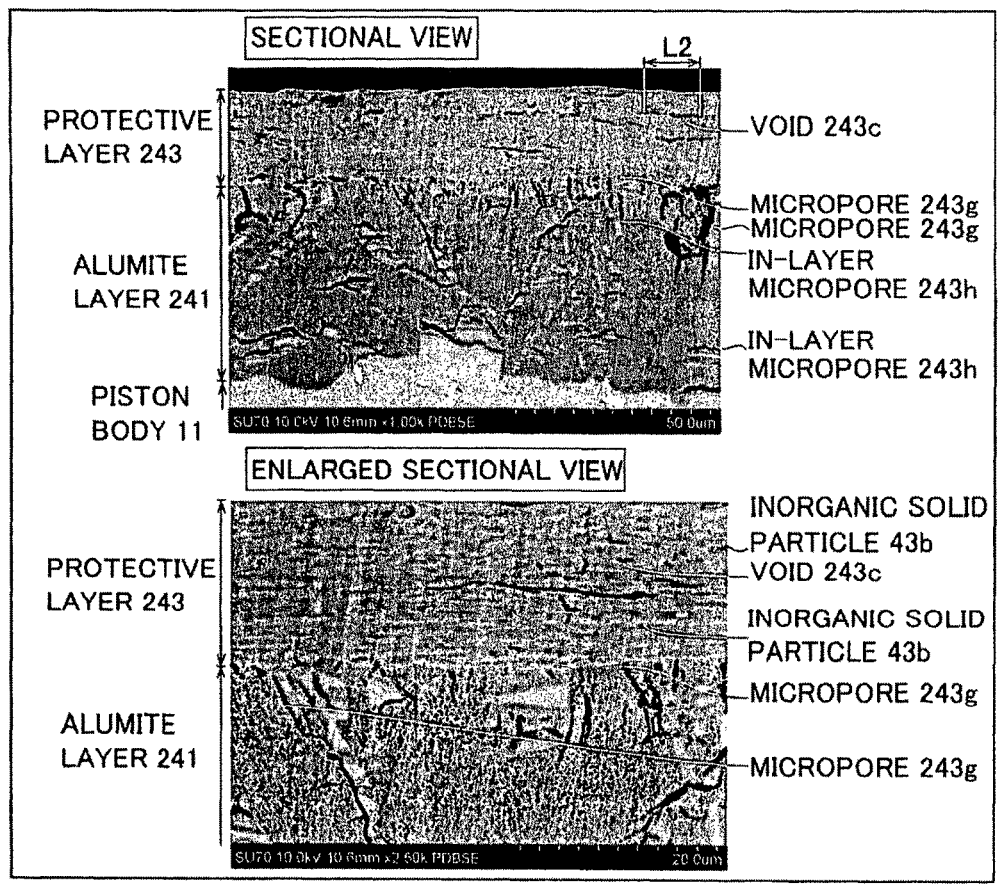
FIG. 16 A sectional photograph of a piston in Example 3 of a third example conducted in order to confirm the effect of the present invention.

From the sectional photograph of FIG. 16, it has been confirmable that the voids 243c are formed so as to extend in the transverse direction perpendicular to the thickness direction. Furthermore, it has been confirmable that the percentage (porosity) of the voids 243c in the protective layer 243 is in the range of 1.5% to 5%.

Thereafter, the characteristics of each of the pistons of Example 3 and Comparative Examples 3 to 5 were evaluated. First, the heat resistance was measured using test materials corresponding to the pistons of Example 3 and Comparative Examples 3 and 4. In addition, the adhesion strength and the Vickers hardness were measured using the test materials corresponding to the pistons of Example 3 and Comparative Examples 3 to 5. The heat resistance and the adhesion strength were measured in the same manner as the adhesion strength measurement test of the aforementioned first example and the aforementioned second example. In the measurement of the Vickers hardness, the cross-section of the coating layer was cut in accordance with the standards of JIS 22244, and the Vickers hardness of the heat insulating layer (the polyimide layer in Comparative Examples 3 and 4, the alumite layer in Comparative Example 5 and Example 3) was measured. A measurement is made at a plurality of locations such that the measurement results of the adhesion strength and the Vickers hardness each have a range.

Furthermore, the real machine durability was measured when each of the pistons of Example 3 and Comparative Examples 3 to 5 was mounted in an internal combustion engine. Specifically, each of the pistons of Example 3 and Comparative Examples 3 to 6 was mounted in a single-cylinder engine as an internal combustion engine. Then, the engine was driven such that the rotational speed thereof was 2200 rpm and the combustion pressure thereof was 4.4 MPa. After the engine was driven for ten hours, the coating layer formed on the surface of the piston was observed.

At that time, when a determination was made that a serious defect such as peeling occurred in the coating layer and the piston was not in a usable state, it was evaluated that the coating layer had no 10-hour durability performance, and a x mark (cross mark) was put. When a determination was made that the piston was in a usable state but a defect such as embrittlement occurred in the coating layer, it was evaluated that the 10-hour durability performance of the coating layer was not insufficient, and a Δ mark (triangle mark) was put. When a determination was made that almost no defect occurred in the coating layer and the piston was in a usable state, the 100-hour durability performance of the coating layer was also evaluated by driving the engine for a hundred hours. Then, when a determination was made that almost no defect occurred in the coating layer and the piston was in a usable state, it was evaluated that the 100-hour durability performance was sufficient and a ○ mark (circle mark) was put.

TABLE 5

| | | | COMPARATIVE EXAMPLE 3 | COMPARATIVE EXAMPLE 4 | COMPARATIVE EXAMPLE 5 | EXAMPLE 3 |
|---|---|---|---|---|---|---|
| COATING LAYER | HEAT INSULATING LAYER | MATERIAL | POLYIMIDE | POLYIMIDE | ALKALINE SILICATE | ALUMITE | ALUMITE |
| | | FILLER MATERIAL | HOLLOW PARTICLE | HOLLOW PARTICLE | HOLLOW PARTICLE | — | — |
| | | CONTENT | 14 | 130 | 95 | — | — |
| | | POROSITY (%) | 15 | 78 | 80 | — | — |
| | | AVERAGE PARTICLE DIAMETER (μm) | 0.108 | 19.76 | 19.76 | — | — |
| | | THICKNESS (μm) | 125 | 100 | 100 | 50~60 | 50~60 |
| | PROTECTIVE LAYER (OUTERMOST LAYER) | MATERIAL | — | ALKALINE SILICATE | — | ALKOXIDE |
| | | FILLER MATERIAL | — | HOLLOW PARTICLE | — | INORGANIC SOLID PARTICLE |
| | | CONTENT | — | 7 | — | 65 |
| | | POROSITY (%) | — | 12 | — | — |
| | | AVERAGE PARTICLE DIAMETER (μm) | — | 0.108 | — | 5.82 |
| | | POROSITY (%) DUE TO VOIDS | — | — | — | 1.5~5 |
| | | THICKNESS (μm) | — | 20 | — | 20~30 |
| CHARACTERISTIC EVALUATION | | HEAT RESISTANCE (° C.) | 550 | 750 | — | 1000 |
| | | ADHESION STRENGTH (MPa) | 6~7 | 4~5 | 3~4 | 14~15 |
| | | VICKERS HARDNESS (Hv) | 30 OR LESS | 30 OR LESS | 70 OR LESS | 100~120 |
| | | REAL MACHINE DURABILITY | 10 h DURABILITY x | 10 h DURABILITY x | 10 h DURABILITY ∆ | 100 h DURABILITY ○ |

As the results, it has been confirmable that in Example 3, the heat resistance is 1000° C., and a sufficient heat resistance is ensured, as shown in Table 5. On the other hand, it has been confirmed that in Comparative Examples 3 and 4, the heat resistance is 750° C. or less, and a sufficient heat resistance is not ensured.

Furthermore, the adhesion strength of Example 3 was in the range of 14 to 15 MPa, which was obviously larger than the adhesion strength (7 MPa or less) of Comparative Examples 3 to 5. In addition, compared with Comparative Example 5, in Example 3, the protective layer 243 was provided such that the adhesion strength was more than three times larger. This is because in Example 3, the inorganic compound constituting the protective layer 243 was impregnated into the alumite layer 241, and hence the adhesion strength between the protective layer 243 and the alumite layer 241 was improved. Furthermore, the alumite layer 241 and the piston body 11 are integrally formed by anodization, and hence the adhesion strength between the alumite layer 241 and the piston body 11 is also high. Consequently, the adhesion strength of the coating layer 240 was conceivably increased.

Figure 17:
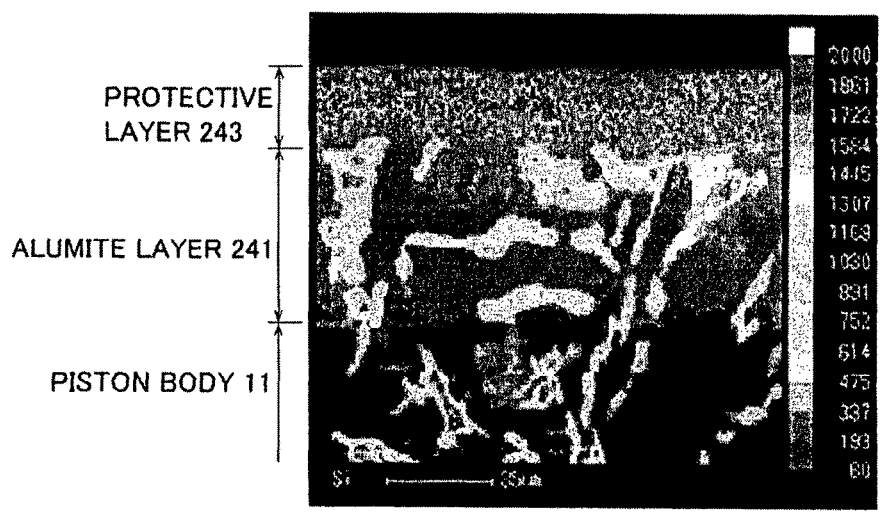
FIG. 17 An EPMA photograph of the piston in Example 3 of the third example conducted in order to confirm the effect of the present invention.

From a photograph of an EPMA (electron probe microanalyzer) in Example 3 shown in FIG. 17, it can be confirmed that the inorganic compound containing silicic acid constituting the protective layer 243 is impregnated into the alumite layer 241. In the photograph of the EPMA in FIG. 16, the distribution of Si atoms is shown, and Si atoms are present in light-colored portions.

On the other hand, in Comparative Example 5, although the adhesion strength between the alumite layer and a piston body was high, no protective layer was formed such that in-layer peeling occurred in the alumite layer, and thus the adhesion strength of a coating layer was conceivably reduced.

In addition, the Vickers strength of Example 3 was in the range of 100 to 120 Hv, which was obviously larger than the Vickers strength (70 Hv or less) of Comparative Examples 3 to 5. This is conceivably because in Example 3, the alumite layer 241 itself had a higher hardness than the resins constituting the heat insulating layers of Comparative Examples 3 and 4, and the inorganic compound constituting the protective layer 243 was impregnated into the alumite layer 241, as described above, and hence the hardness in the alumite layer 241 was increased.

In Example 3, almost no defect clearly occurred in the coating layer 240 on both the 10-hour durability performance and the 100-hour durability performance, and the piston 210 was in a usable state. On the other hand, in Comparative Examples 3, and 4, there was no 10-hour durability performance, and in Comparative Example 5, the 10-hour durability performance was insufficient. This is conceivably because the scale-like inorganic solid particles 43b were dispersed in the protective layer 243 such that the protective layer 243 was reliably maintained, and the adhesion between the protective layer 243 and the alumite layer 241 was improved such that the long-term durability of the coating layer 240 was improved in Example 3. In Comparative Example 5, it has been confirmable that the alumite layer of the coating layer exposed to the outside is embrittled due to the combustion pressure of an engine. Also from this, it has been confirmable that the protective layer 243 of Example 3 is formed on the surface 241e of the alumite layer 241 such that the long-term durability of the coating layer 240 can be improved.

Next, the influence of differences in the material contained in the water-based coating and changes of the void content in the alumite layer made when the viscosity of the water-based coating was varied, for example, were examined. Here, in addition to the piston 210 (see FIG. 1) of Example 3, the pistons 210 of Examples 4 and 5 were prepared. In Example 4, the piston 210 was prepared in the same manner as in Example 3 except that the viscosity of the water-based coating after stirring was adjusted to be 10 mPa·s. In Example 5, the piston 210 was prepared in the same manner as in Example 3 except that the viscosity of the water-based coating after stirring was adjusted to be 15 mPa·s.

On the other hand, as Comparative Example 6, a piston in which the conditions of anodization in Example 3 were changed and a protective layer was made of polysilazane, unlike Example 3, was prepared. Specifically, an alumite layer was formed by performing anodization on a piston body made of an aluminum alloy equivalent to AC8A-T6. At this time, the thickness of the alumite layer was in the range of 30 to 40 μm. Thereafter, a 20% polysiloxane solution was applied onto a surface of the alumite layer, and a heat treatment was performed thereon. In Comparative Example 6, no scale-like inorganic solid particles were added to the polysiloxane solution. Then, steps of these application and heat treatment were repeated such that the protective layer including a layer body made of an inorganic compound mainly including silicic acid was formed on the surface of the alumite layer. In this case, the thickness of the protective layer was in the range of 1 to 5 μm. Thus, the piston of Comparative Example 6 was prepared.

Then, test materials corresponding to the pistons of Example 3 and Comparative Example 6 were used to measure the heat resistance under the same conditions as in the aforementioned first example. Furthermore, test materials corresponding to the pistons of Examples 3 to 5 and Comparative Example 6 were used to measure the void contents of micropores and the void contents of nanopores in alumite layers and the thermal conductivities and the specific heats per unit volume in coating layers, respectively. The thermal conductivities and specific heats per unit volume were measured by a flash method and a DSC method, respectively. In addition, the void contents of the micropores, the void contents of the nanopores, the thermal conductivities, and the specific heats per unit volume are measured using a plurality of test materials, and hence values thereof each have a range.

parative Example 6 has a temporary heat resistance, it is conceivably difficult to maintain the heat resistance over a long period of time.

In addition, the void content of the micropores of Comparative Example 6 was in the range of 20 to 25% while the void content of the micropores of each of Examples 3 to 5 was increased to 30% or more. Furthermore, the void content of the nanopores of Comparative Example 6 was in the range of 5 to 8% while the void content of the micropores of each of Examples 3 to 5 was increased to 10% or more. Thus, it has been confirmable that an area occupied by the voids in the coating layer is larger in Examples 3 to 5 than in Comparative Example 6. This is conceivably because compared with Comparative Example 6 using the polysiloxane solution, in Examples 3 to 5, regions (voids) into which no inorganic compound had been impregnated could be reliably formed in the micropores and the nanopores. In addition, the void content of the micropores was larger than the void content of the nanopores. This is conceivably because the water-based coating was more likely to be impregnated into the nanopores due to its capillarity.

The thermal conductivity of Comparative Example 6 was in the range of 1.4 to 1.6 (W/m·K) while the thermal conductivity of each of Examples 3 to 5 was reduced to 0.6 (W/m·K) or less. Thus, it has been confirmable that in the coating layer of each of Examples 3 to 5, heat is more unlikely to escape as compared with Comparative Example 6. The specific heat per unit volume of Comparative Example 6 was in the range of 3500 to 3700 (kJ/m$^3$·K) while the specific heat per unit volume of each of Examples 3 to 5 was reduced to 1900 (kJ/m$^3$·K) or less. Thus, it has been confirmable that the temperature of the coating layer of each of Examples 3 to 5 increases with a smaller amount of heat as compared with Comparative Example 6, and hence the amount of heat used to increase the temperature of the coating layer can be reduced. Consequently, it has been confirmable that in Examples 3 to 5, a heat loss (cooling

TABLE 6

| | VISCOSITY OF WATER-BASED COATING (mPa · s) | THICKNESS (μm) | | HEAT RESIST-ANCE (° C.) | VOID CONTENT (%) | | THERMAL CONDUC-TIVITY (W/m · K) | SPECIFIC HEAT PER UNIT VOLUME (kJ/m$^3$ · K) |
|---|---|---|---|---|---|---|---|---|
| | | ALUMITE LAYER | PROTECTIVE LAYER | | MICROPORE | NANOPORE | | |
| EXAMPLE 3 | 5 | 50~60 | 20~30 | 1000 | 30~35 | 10~13 | 0.5~0.6 | 1800~1900 |
| EXAMPLE 4 | 10 | 50~60 | 20~30 | — | 35~40 | 15~18 | 0.47~0.55 | 1700~1800 |
| EXAMPLE 5 | 15 | 50~60 | 20~30 | — | 40~45 | 18~20 | 0.42~0.48 | 1600~1700 |
| COM-PARATIVE EXAMPLE 6 | — | 30~40 | 1~5 | 1000 | 20~25 | 5~8 | 1.4~1.6 | 3500~3700 |

As the results, it has been confirmable that both the heat resistances of Example 3 and Comparative Example 6 are 1000° C., and sufficient heat resistances are ensured, as shown in Table 6. However, the thickness of the protective layer of Comparative Example 6 is in the range of 1 to 5 μm, which is very small. Furthermore, in Comparative Example 6, the application and the heat treatment are repeated such that the protective layer is formed, and hence an interface is formed in the protective layer. Consequently, the protective layer of Comparative Example 6 is conceivably a discontinuous film. Therefore, in the piston of Comparative Example 6, peeling is likely to occur in layers of the protective layer. Consequently, although the piston of Comloss) in the coating layer can be reduced as compared with Comparative Example 6, and hence the heat insulating properties can be improved. Incidentally, a reduction in thermal conductivity and a reduction in specific heat per unit volume in each of Examples 3 to 5 are conceivably due to a large area occupied by the voids in the coating layer.

Furthermore, in each of Examples 3 to 5, the void content of the micropores 241g and the void content of the nanopores 241f increased as the viscosity of the water-based coating increased. This is conceivably because with the increasing viscosity of the water-based coating, the water-based coating was unlikely to migrate inside the micropores 241g and the nanopores 241f, and thus the amount of the water-based coating (inorganic compound) impregnated into the micropores 241g and the nanopores 241g was reduced. Thus, it has been confirmable that the void content of the alumite layer 241 can be adjusted by adjusting the viscosity of the water-based coating.

In Examples 3 to 5, the thermal conductivity and the specific heat per unit volume reduced as the viscosity of the water-based coating increased. This is conceivably due to the fact that the area occupied by the voids in the coating layer 241 was increased. Consequently, the desired coating layer 241 having a high strength and high heat insulating properties can conceivably be formed by adjusting the conditions of anodization and the viscosity of the water-based coating in consideration of the balance between a reduction in the strength of the coating layer 241 and improvement in the heat insulating properties due to the voids.

[Modifications]

The embodiments and Examples disclosed this time must be considered as illustrative in all points and not restrictive. The range of the present invention is shown not by the above description of the embodiments and Examples but by the scope of claims for patent, and all modifications within the meaning and range equivalent to the scope of claims for patent are further included.

Figure 18:
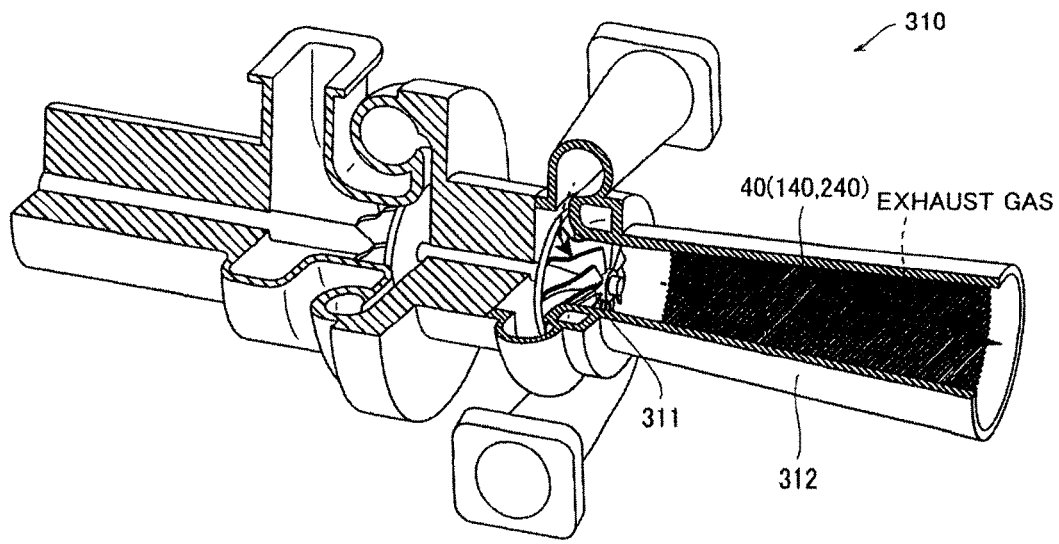
FIG. 18 A sectional view showing a turbocharger mounted on a vehicle according to a first modification of the present invention.
Figure 19:
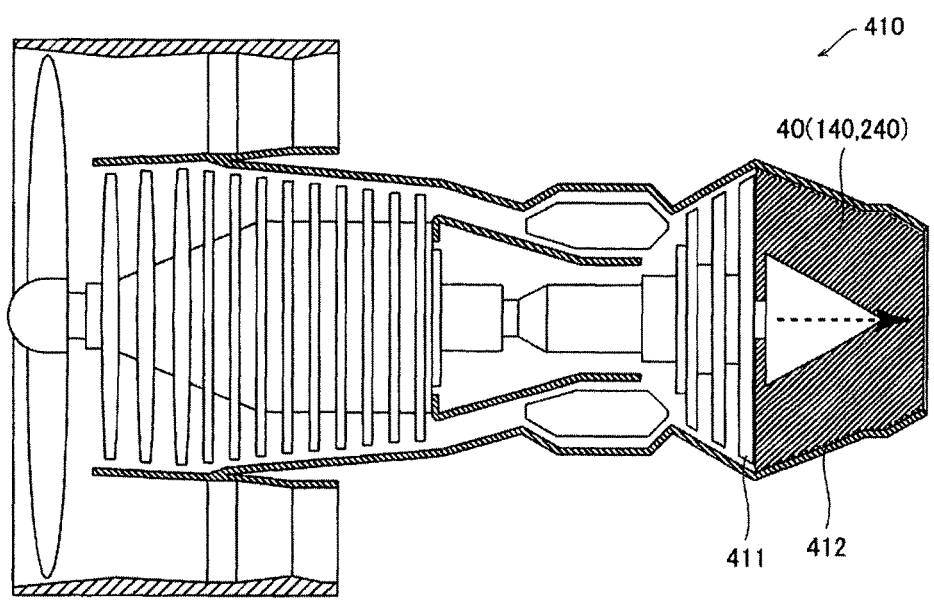
FIG. 19 A sectional view showing a jet engine mounted on a vehicle according to a second modification of the present invention.

For example, while the example in which the piston 10 (110, 210) is used as the vehicle mechanical component according to the present invention has been shown in each of the aforementioned first to third embodiments, the present invention is not restricted to this. The structure according to the present invention may be applied to a vehicle mechanical component requiring heat resistance and heat insulating properties. For example, as in a first modification of the present invention shown in FIG. 18, the structure according to the present invention may be applied to a turbocharger 310 mounted on a vehicle. Specifically, in the turbocharger 310, the coating layer 40 according to the aforementioned first embodiment, the coating layer 140 of the aforementioned second embodiment, or the coating layer 240 according to the aforementioned third embodiment may be formed on the inner surface (a hatched portion in FIG. 18) of a passage 312, through which high-temperature exhaust gas flows, downstream of a turbine wheel 311. Similarly, as in a second modification of the present invention shown in FIG. 19, the structure according to the present invention may be applied to a jet engine 410 mounted on a vehicle. Specifically, in the jet engine 410, the coating layer 40, 140, or 240 may be formed on the inner surface (a hatched portion in FIG. 19) of a passage 412, through which high-temperature compressed air flows, downstream of a turbine 411. The turbocharger 310 and the jet engine 410 are examples of a "vehicle mechanical component" in the present invention. The passages 312 and 412 are examples of a "mechanical component body" in the present invention.

Figure 20:
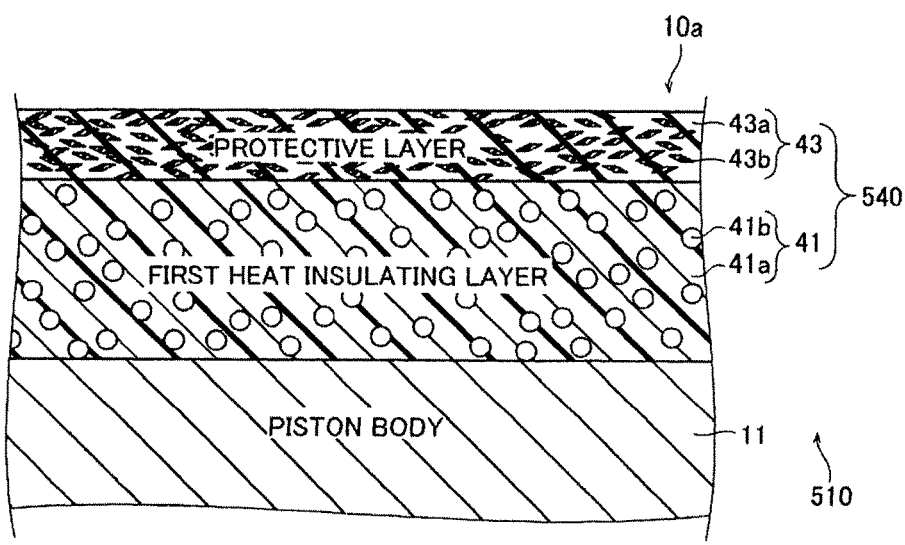
FIG. 20 An enlarged sectional view showing the vicinity of a coating layer according to a third modification of the present invention.

While the example in which the first heat insulating layer 41 (141) and the second heat insulating layer 42 (142) are formed as heat insulating layers has been shown in each of the aforementioned first and second embodiments, the present invention is not restricted to this. According to the present invention, only one heat insulating layer may be formed. For example, as in a coating layer 540 of a piston 510 according to a third modification of the present invention shown in FIG. 20, only a first heat insulating layer 41 and a protective layer 43 may be provided, and no second heat insulating layer may be provided. Alternatively, in the third modification, only a second heat insulating layer and the protective layer may be provided, and no first heat insulating layer may be provided. Furthermore, the heat insulating layer may have a three or more layer structure.

While the example in which the layer body 41a of the first heat insulating layer 41 (141) is made of an organic material has been shown in each of the aforementioned first and second embodiments, the present invention is not restricted to this. According to the present invention, the layer body of the first heat insulating layer may be made of an inorganic material such as silica, zirconia, alumina, or ceria. Incidentally, the layer body of the first heat insulating layer is made of an inorganic material such that the strength, the heat resistance, and the chemical resistance thereof can be improved as compared with the case where an organic material is used.

While the layer body 144a of the primer layer 144 and the layer body 41a of the first heat insulating layer 141 each are made of an organic material in the aforementioned second embodiment, the present invention is not restricted to this. According to the present invention, one of the layer body of the first heat insulating layer and the layer body of the primer layer may be made of an inorganic material, and the other may be made of an organic material. In order to improve the adhesion between the primer layer and the first heat insulating layer, the layer body of the first heat insulating layer and the layer body of the primer layer are preferably made of the same type of material. That is, when the layer body of the first heat insulating layer is made of an inorganic material, the layer body of the primer layer is also preferably made of an inorganic material, and when the layer body of the first heat insulating layer is made of an organic material, the layer body of the primer layer is also preferably made of an organic material.

While the example in which the amino-based coupling agent is used as a coupling agent to be added to the protective layer has been shown in the aforementioned second embodiment, the present invention is not restricted to this. According to the present invention, a coupling agent other than the amino-based coupling agent may be used as a coupling agent to be added to the protective layer. For example, a vinyl-based coupling agent such as vinyltriethoxysilane, vinyltrimethoxysilane, or vinylmethyldimethoxysilane, an epoxy-based coupling agent such as glycidoxypropyltrimethoxysilane or glycidoxypropyltriethoxysilane, a methacryl-based coupling agent such as methacryloxypropyltriethoxysilane or methacryloxypropyltrimethoxysilane, or an isocyanate-based coupling agent such as isocyanatopropyltriethoxysilane or isocyanatopropyltrimethoxysilane may be used. Even when such a coupling agent is added to the protective layer, the adhesion between the second heat insulating layer and the protective layer can be improved, as shown in the results of the test materials 5a to 5d of the aforementioned second example.

While the example in which the adhesion between the first heat insulating layer 141 and the second heat insulating layer 142 is improved by performing the laser processing and the modification processing has been shown in the aforementioned second embodiment, the present invention is not restricted to this. According to the present invention, the adhesion between the first heat insulating layer and the second heat insulating layer may be improved by performing only one of the laser processing and the modification processing. Even in this case, as shown in the results of the test materials 1a and 1b of the aforementioned second example, the adhesion between the first heat insulating layer and the second heat insulating layer can be improved. Alternatively, the adhesion between the first heat insulating layer and the second heat insulating layer may be improved by surface processing using a corona discharge or an atmospheric-pressure plasma.

While the example in which the recesses 141c are formed in the first heat insulating layer 141 by the laser processing has been shown in the aforementioned second embodiment, the present invention is not restricted to this. According to the present invention, the recesses may be formed in the first heat insulating layer by a method other than laser processing. In this case, the recesses are preferably formed by removing the partial surface of the first heat insulating layer by the laser processing or the like than by roughening the entire surface of the first heat insulating layer by sandblast processing or the like since the shear resistance can be increased.

While the example in which the piston body (mechanical component body) 11 is made of an aluminum alloy has been shown in each of the aforementioned first to third embodiments, the present invention is not restricted to this. According to the present invention, the mechanical component body may be made of a metal material other than an aluminum alloy, or may be made of an organic material such as a resin. When anodization is performed on the mechanical component body as in the aforementioned third embodiment, the mechanical component body should be made of a metal material on which anodization can be performed.

While the example in which no voids are provided in the protective layer has been shown in each of the aforementioned first and second embodiments, the present invention is not restricted to this. According to the present invention, similarly to the aforementioned third embodiment, voids may be provided in the protective layer also in the aforementioned first and second embodiments.

While the example in which the heat insulating layer made of an organic material is provided directly on the surface of the piston body has been shown in each of the aforementioned first and second embodiments, the present invention is not restricted to this. According to the present invention, the heat insulating layer made of an organic material may be formed on the surface of the alumite layer after the alumite layer is formed on the surface of the piston body. Even in this case, the void contents of the micropores and the nanopores in the alumite layer can be adjusted by adjusting the viscosity of the organic coating used to prepare the heat insulating layer, similarly to the aforementioned third embodiment.

DESCRIPTION OF REFERENCE NUMERALS 10, 110, 210, 510: piston (vehicle mechanical component)
11: piston body (mechanical component body)
41, 141: first heat insulating layer (heat insulating layer)
41b: hollow particle (first heat insulating layer hollow particle)
42, 142: second heat insulating layer (heat insulating layer)
42b: hollow particle (second heat insulating layer hollow particle)
43, 143, 243: protective layer
43b: inorganic solid particle
141c: recess
144: primer layer
241: alumite layer (heat insulting layer, anodized coating layer)
241e: surface (on the side of the protective layer)
241f: nanopore
241g: micropore
243c: void
310: turbocharger (vehicle mechanical component)
410: jet engine (vehicle mechanical component)
312, 412: passage (mechanical component body)

The invention claimed is:

1. A vehicle mechanical component comprising:
a mechanical component body;
a heat insulating layer formed on the mechanical component body; and
a protective layer formed on the heat insulating layer and including an inorganic compound that includes an alkoxide and scale-like inorganic solid particles dispersed in the inorganic compound, wherein
the protective layer further includes a void elongated in a transverse direction perpendicular to a thickness direction of the protective layer.

2. The vehicle mechanical component according to claim 1, wherein
the scale-like inorganic solid particles are made of mica, talc, or wollastonite.

3. The vehicle mechanical component according to claim 1, wherein
the void is formed between layers of the scale-like inorganic solid particles stacked in the protective layer.

4. The vehicle mechanical component according to claim 1, wherein
a binder including a coupling agent and having an amino group is dispersed in the inorganic compound of the protective layer, and
the amino group of the binder and a constituent component of the heat insulating layer bind to each other.

5. The vehicle mechanical component according to claim 1, wherein
the heat insulating layer includes a first heat insulating layer formed on the mechanical component body and a second heat insulating layer formed on a surface of the first heat insulating layer and including an inorganic compound, and
a functional group that binds to a constituent component of the second heat insulating layer is provided on the surface of the first heat insulating layer on a side of the second heat insulating layer by modification processing using an organic metallic compound.

6. The vehicle mechanical component according to claim 1, wherein
the heat insulating layer includes a first heat insulating layer formed on the mechanical component body and a second heat insulating layer formed on a surface of the first heat insulating layer, and
a recess that the second heat insulating layer enters is provided on the surface of the first heat insulating layer on a side of the second heat insulating layer.

7. The vehicle mechanical component according to claim 1, wherein
the heat insulating layer includes an anodized coating layer formed on a surface of the mechanical component body, and the anodized coating layer includes a micrometer-sized micropore extending from a surface thereof on a side of the protective layer and a nanometer-sized nanopore extending from the surface thereof on the side of the protective layer, and
an amount of the inorganic compound impregnated into the micropore and the nanopore is adjusted such that a void content of the micropore is larger than a void content of the nanopore.

8. The vehicle mechanical component according to claim 1, wherein
the scale-like inorganic solid particles are dispersed in the inorganic compound to be at least 35 vol % and not more than 80 vol %.

9. The vehicle mechanical component according to claim 1, wherein
the heat insulating layer includes a first heat insulating layer, formed on the mechanical component body, in which first heat insulating layer hollow particles are dispersed and a second heat insulating layer formed on a surface of the first heat insulating layer.

10. The vehicle mechanical component according to claim 9, further comprising a primer layer, disposed on a surface of the mechanical component body between the mechanical component body and the first heat insulating layer, in which neither hollow particles nor solid particles are dispersed.

11. The vehicle mechanical component according to claim 10, wherein
both a thickness of the first heat insulating layer and a thickness of the second heat insulating layer are larger than a thickness of the protective layer, and are larger than a thickness of the primer layer.

12. The vehicle mechanical component according to claim 9, wherein
the second heat insulating layer includes a heat insulating layer inorganic compound including an alkoxide or an alkaline silicate and second heat insulating layer hollow particles dispersed in the heat insulating layer inorganic compound.

13. The vehicle mechanical component according to claim 1, wherein
a thickness of the protective layer is at least 10 μm and not more than 500 μm.

14. A piston comprising:
a piston body;
a heat insulating layer formed on the piston body; and
a protective layer formed on the heat insulating layer and including an inorganic compound that includes an alkoxide and scale-like inorganic solid particles dispersed in the inorganic compound, wherein
the protective layer further includes a void elongated in a transverse direction perpendicular to a thickness direction of the protective layer.

15. The piston according to claim 14, wherein
the scale-like inorganic solid particles are made of mica, talc, or wollastonite.

16. The piston according to claim 14, wherein
the void is formed between layers of the scale-like inorganic solid particles stacked in the protective layer.

17. The piston according to claim 14, wherein
a binder including a coupling agent and having an amino group is dispersed in the inorganic compound of the protective layer, and
the amino group of the binder and a constituent component of the heat insulating layer bind to each other.

18. The piston according to claim 14, wherein
the heat insulating layer includes a first heat insulating layer formed on the piston body and a second heat insulating layer formed on a surface of the first heat insulating layer and including an inorganic compound, and
a functional group that binds to a constituent component of the second heat insulating layer is provided on the surface of the first heat insulating layer on a side of the second heat insulating layer by modification processing using an organic metallic compound.

19. The piston according to claim 14, wherein
the heat insulating layer includes a first heat insulating layer formed on the piston body and a second heat insulating layer formed on a surface of the first heat insulating layer, and
a recess that the second heat insulating layer enters is provided on the surface of the first heat insulating layer on a side of the second heat insulating layer.

20. The piston according to claim 14, wherein
the heat insulating layer includes an anodized coating layer formed on a surface of the piston body, and the anodized coating layer includes a micrometer-sized micropore extending from a surface thereof on a side of the protective layer and a nanometer-sized nanopore extending from the surface thereof on the side of the protective layer, and
an amount of the inorganic compound impregnated into the micropore and the nanopore is adjusted such that a void content of the micropore is larger than a void content of the nanopore.

* * * * *